(12) United States Patent
Strong

(10) Patent No.: US 11,472,645 B2
(45) Date of Patent: Oct. 18, 2022

(54) DEVICES AND METHODS FOR VIBRATION OF CONTAINERS

(71) Applicant: David A. Strong, Westlake, OH (US)

(72) Inventor: David A. Strong, Westlake, OH (US)

(*) Notice: Subject to any disclaimer, the term of this patent is extended or adjusted under 35 U.S.C. 154(b) by 275 days.

(21) Appl. No.: 16/990,243

(22) Filed: Aug. 11, 2020

(65) Prior Publication Data

US 2021/0047136 A1 Feb. 18, 2021

Related U.S. Application Data

(60) Provisional application No. 62/930,650, filed on Nov. 5, 2019, provisional application No. 62/885,642, filed on Aug. 12, 2019.

(51) Int. Cl.
*B65G 69/02* (2006.01)
*B65G 27/22* (2006.01)

(52) U.S. Cl.
CPC ............ *B65G 69/02* (2013.01); *B65G 27/22* (2013.01); *B65G 2814/0258* (2013.01)

(58) Field of Classification Search
CPC .................................. B65G 69/02; B65G 27/22
See application file for complete search history.

(56) References Cited

U.S. PATENT DOCUMENTS

| | | | | |
|---|---|---|---|---|
| 735,209 A | * | 8/1903 | Carnochan | ............... B65B 1/22 141/237 |
| 2,010,220 A | * | 8/1935 | Cocks | ...................... B65B 1/22 366/208 |
| 3,096,081 A | * | 7/1963 | Helm | ....................... B65B 1/22 425/456 |
| 3,968,818 A | | 7/1976 | Gerrans | |
| 4,174,599 A | | 11/1979 | Callet et al. | |
| 2022/0184631 A1 | * | 6/2022 | Verbos | ................... B65G 69/02 |

OTHER PUBLICATIONS

International Search Report dated Feb. 2, 2021 from PCT/US2020/045728.

* cited by examiner

*Primary Examiner* — William R Harp
(74) *Attorney, Agent, or Firm* — Fay Sharpe LLP

(57) ABSTRACT

Devices and methods for compaction of an asymmetric load are disclosed herein. In some embodiments, a movable upper structure is connected to a stationary base structure through front end pivot linkages and rear end pivot linkages. One or more actuators impart motion to the upper structure. The motion of the upper structure is controlled by adjusting the length and position of the pivot linkages. In other embodiments, the pivot linkages are attached to a pull arm that is attached to an actuator, and the pull arm imparts motion to the upper structure.

20 Claims, 17 Drawing Sheets

DEVICES AND METHODS FOR VIBRATION OF CONTAINERS

CROSS-REFERENCE TO RELATED APPLICATIONS

This application claims priority to U.S. Provisional Patent Application Ser. No. 62/885,642, filed on Aug. 12, 2019, and to U.S. Provisional Patent Application Ser. No. 62/930,650, filed on Nov. 5, 2019, each of which is incorporated by reference in its entirety.

BACKGROUND

The present disclosure relates to vibration or rocking of containers, boxes, or Gaylord containers.

In certain situations, it is desirable to vibrate or rock a container, box, or gaylord to induce the contents of the container or box to settle. However, current electrical vibration tables have a high monetary cost. In addition, the container/box can "walk off" the vibration table if purely vertical motion is used for vibration, creating a safety hazard.

It would be desirable to provide systems and methods to overcome this problem and others.

BRIEF DESCRIPTION

The present disclosure relates to a vibratory unit or compaction device, which is used to induce the smaller contents within a large container to settle. For example, smaller items become packed more tightly within the large container such that any free space between them is reduced, and the majority of free space is concentrated at the top of the large container. This permits additional smaller items to be placed into the large container, increasing packing efficiency and reducing the number of large containers needed for a given number of smaller items. This also improves the balance of the large container, and reduces the asymmetry of the weight within the large container.

In addition, in the past, associates have tried to "flex" the side of the large container to help settle the smaller items therein and increase the capacity of the large container. But in some instances, the side of the large container (which is made of cardboard) rips and the associate falls backwards, causing injuries such as broken arms or wrists when they hit the floor. A "reach tool" can be used to reach into the large container to help even out the smaller items, but this can take additional time. The use of the vibratory unit or compaction device results in an increased number of smaller items that can be shipped in the large container, reduced time to accomplish the packing task, and increased worker safety through the use of an engineered solution.

Disclosed in various embodiments are compaction devices including: an upper structure configured to hold a container; a base structure configured to be connected to the upper structure through two front end pivot linkages, and two rear end pivot linkages; and a pneumatic cylinder configured to convey motion to the upper structure. The two front end pivot linkages may have a different length than the two rear end pivot linkages.

In some embodiments, the two front end pivot linkages are longer than the rear end pivot linkages. In some embodiments, the two rear end pivot linkages are longer than the front end pivot linkages. In some embodiments, in a resting position: the front end pivot linkages each have a longitudinal axis perpendicular to a lower edge of the base structure; and the rear end pivot linkages each have a longitudinal axis that form an acute angle with the lower edge of the base structure. In some embodiments, in a resting position: the rear end pivot linkages each have a longitudinal axis perpendicular to a lower edge of the base structure; and the front end pivot linkages each have a longitudinal axis that form an acute angle with the lower edge of the base structure. In some embodiments, the pneumatic cylinder is a first pneumatic cylinder, and the compaction device further comprises a second pneumatic cylinder.

In another aspect, disclosed herein are compaction methods for operating a compaction device, comprising: using a pneumatic cylinder to cause an upper structure to move. The upper structure is connected to a base structure through two front end pivot linkages, and two rear end pivot linkages; and the two front end pivot linkages have a different length than the two rear end pivot linkages.

In some embodiments, the two front end pivot linkages are longer than the rear end pivot linkages. In some embodiments, the two rear end pivot linkages are longer than the front end pivot linkages. In some embodiments, in a resting position: the front end pivot linkages each have a longitudinal axis perpendicular to a lower edge of the base structure; and the rear end pivot linkages each have a longitudinal axis that form an acute angle with the lower edge of the base structure. In some embodiments, in a resting position: the rear end pivot linkages each have a longitudinal axis perpendicular to a lower edge of the base structure; and the front end pivot linkages each have a longitudinal axis that form an acute angle with the lower edge of the base structure. In some embodiments, the pneumatic cylinder is a first pneumatic cylinder, and the compaction device further comprises a second pneumatic cylinder.

In yet other aspects, disclosed are methods for balancing an asymmetric load of a product, comprising: placing a container with the asymmetric load in an upper structure, wherein the container has a greater amount of the product located closer to a non-loading end of the upper structure than closer to a loading end of the upper structure; and using a pneumatic cylinder to convey motion to the upper structure. The upper structure is connected to a base structure by two front end pivot linkages and two rear end pivot linkages; and the two rear end pivot linkages are longer than the two front end pivot linkages so that the two rear end pivot linkages convey a greater amplitude of motion to the upper structure than the two front end pivot linkages.

Also disclosed are compaction devices, including: an upper structure configured to hold a container; a base structure configured to connect to the upper structure through: (i) a loading end upper toggle pivot linkage connected to a loading end lower toggle pivot linkage, and (ii) a non-loading end upper toggle pivot linkage connected to a non-loading end lower toggle pivot linkage; a pull arm configured to connect the loading end upper and lower toggle pivot linkages to the non-loading end upper and lower toggle pivot linkages; and a pneumatic cylinder configured to convey motion to the upper structure through the pull arm.

In some embodiments, devices as described in the preceding paragraph further include: a first cam follower connected to the base structure, wherein the first cam follower is configured to guide the base structure by moving along a first flat surface. The device may further include a second cam follower connected to the base structure, wherein the second cam follower is configured to guide the base structure by moving along a second flat surface. The first flat surface may be at an 85° angle with a lower edge of the base structure. In some embodiments, the base structure comprises first side and a second side; the loading end upper toggle pivot linkage is a first side loading end upper toggle pivot linkage; the loading end lower toggle pivot linkage is a first side loading end lower toggle pivot linkage; the non-loading end upper toggle pivot linkage is a first side non-loading end upper toggle pivot linkage; the non-loading end lower toggle pivot linkage is a first side non-loading end lower toggle pivot linkage; the pull arm is a first side pull arm; the pneumatic cylinder is a first side pneumatic cylinder; and the compaction device further comprises: a second side loading end upper toggle pivot linkage connected to a second side loading end lower toggle pivot linkage; a second side non-loading end upper toggle pivot linkage connected to a second side non-loading end lower toggle pivot linkage; a second side pull arm configured to connect the second side loading end upper and lower toggle pivot linkages to the second side non-loading end upper and lower toggle pivot linkages; and a second side pneumatic cylinder configured to convey motion to the upper structure through the second side pull arm. In some embodiments, the loading end upper toggle pivot linkage, the loading end lower toggle pivot linkage, the non-loading end upper toggle pivot linkage, and the non-loading end lower toggle pivot linkage each have an equal length. In some embodiments, the toggle joints are configured to convey the motion to the upper structure such that the motion is linear.

Also disclosed in various embodiments are compaction devices, comprising: an upper structure configured to hold a container; a base structure connected to the upper structure through a first front end pivot linkage and a first rear end pivot linkage; and a first actuator configured to convey motion to the upper structure; wherein the first front end pivot linkage has a different length from the first rear end pivot linkage.

In some embodiments, the first front end pivot linkage is longer than the first rear end pivot linkage. In other embodiments, the first rear end pivot linkage is longer than the first front end pivot linkage.

In some embodiments, in a resting position: the first front end pivot linkage has a longitudinal axis perpendicular to a lower edge of the base structure; and the first rear end pivot linkage has a longitudinal axis that forms an acute angle with the lower edge of the base structure.

In other embodiments, in a resting position: the first rear end pivot linkage has a longitudinal axis perpendicular to a lower edge of the base structure; and the first front end pivot linkage has a longitudinal axis that forms an acute angle with the lower edge of the base structure.

In particular embodiments, the first actuator is in the form of a pneumatic cylinder. Additional actuators and pneumatic cylinders can also be present.

The upper structure of the compaction device may comprise a floor and three vertical sidewalls extending perpendicularly from the floor on a first side, a second side, and a rear side of the upper structure. The first front end pivot linkage and the first rear end pivot linkage may be connected to the vertical sidewall on the first side of the upper structure, with the first actuator conveying motion proximate the first side of the upper structure. In particular embodiments, the compaction device can further comprise: a second front end pivot linkage and a second rear end pivot linkage connected to the vertical sidewall on the second side of the upper structure and connected to the base structure; and a second actuator that conveys motion proximate the second side of the upper structure; wherein the first front end pivot linkage and the second front end pivot have the same length; and wherein the first rear end pivot linkage and the second rear end pivot have the same length.

In some embodiments, the compaction device further comprises an adapter mounted upon the vertical sidewall of one or both sides of the upper structure, the adapter(s) configured to reduce an effective width of the upper structure. The adapter may comprise an outer bracket, an inner bracket, at least one displacement arm, and a locking arm for fixing the outer bracket and the inner bracket relative to each other. In particular embodiments, a retainer lock device is present on one end of the inner bracket. The retainer lock device rotates around a longitudinal axis of the inner bracket, and can be used to hold a container against the rear sidewall of the upper structure. A clamp mounted upon the inner bracket engages the retainer lock device in two different positions.

The compaction device can further comprise a toe guard on a front side of the upper structure.

The base structure may comprise a rear housing for the first actuator; a first sidewall; and a second sidewall; wherein the upper structure is located between the first sidewall and the second sidewall of the base structure.

The compaction device can also further comprise a first side guard and a second side guard attached to the upper structure, such that the first sidewall and the second sidewall of the stationary base structure are located between the upper structure and the side guards.

The compaction device may further comprise a control system for controlling the first actuator. The control system can be located proximate a rear end of the base structure, and the device may further comprise a pushbutton for activating the control system which is located proximate a front end of the base structure. In embodiments, generally, the base structure has a larger footprint than the upper structure.

Also disclosed are various methods for operating a compaction device, comprising: placing a container with an asymmetric load in an upper structure of the compaction device; and using at least a first actuator to cause the upper structure to move; wherein the compaction device has a structure as described herein.

Also disclosed herein are compaction devices, comprising: an upper structure configured to hold a container, a first side of the upper structure being connected to a first front end upper toggle pivot linkage and a first rear end upper toggle pivot linkage; a base structure, a first side of the base structure being connected to a first front end base toggle pivot linkage and a first rear end base toggle pivot linkage; a first pull arm connected to the first front end upper toggle pivot linkage, the first front end base toggle pivot linkage, the first rear end upper toggle pivot linkage, and the first rear end base toggle pivot linkage; and a first actuator connected to the first pull arm for conveying motion to the upper structure.

In some embodiments, the compaction device further comprises a primary cam follower connected to a first side of the upper structure, wherein the primary cam follower is configured to guide the upper structure by moving along a flat surface of a primary cam located on a first side of the base structure. The flat surface of the primary cam can form an angle of about 60° to 88° angle with a lower edge of the base structure.

In further embodiments, the primary cam is proximate a front end of the base structure, and the compaction device further comprises a secondary cam follower connected to the first side of the upper structure, wherein the secondary cam follower moves along a surface of a secondary cam located on the first side of the base structure. In more specific embodiments, the flat surface of the primary cam forms a primary angle with a lower edge of the base structure, and wherein the flat surface of the secondary cam forms a secondary angle with the lower edge of the base structure, and wherein the primary angle is different from the secondary angle.

The first front end upper toggle pivot linkage, the first front end base toggle pivot linkage, the first rear end upper toggle pivot linkage, and the first rear end base toggle pivot linkage may be of equal length.

In further embodiments, the compaction device may have a structure wherein: a second side of the upper structure is connected to a second front end upper toggle pivot linkage and a second rear end upper toggle pivot linkage; a second side of the base structure is connected to a second front end base toggle pivot linkage and a second rear end base toggle pivot linkage; a second pull arm is connected to the second front end upper toggle pivot linkage, the second front end base toggle pivot linkage, the second rear end upper toggle pivot linkage, and the second rear end base toggle pivot linkage; and a second actuator is connected to the second pull arm for conveying motion to the upper structure.

The upper structure of the compaction device may comprise a floor and three vertical sidewalls extending perpendicularly from the floor on a first side, a second side, and a rear side of the upper structure.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
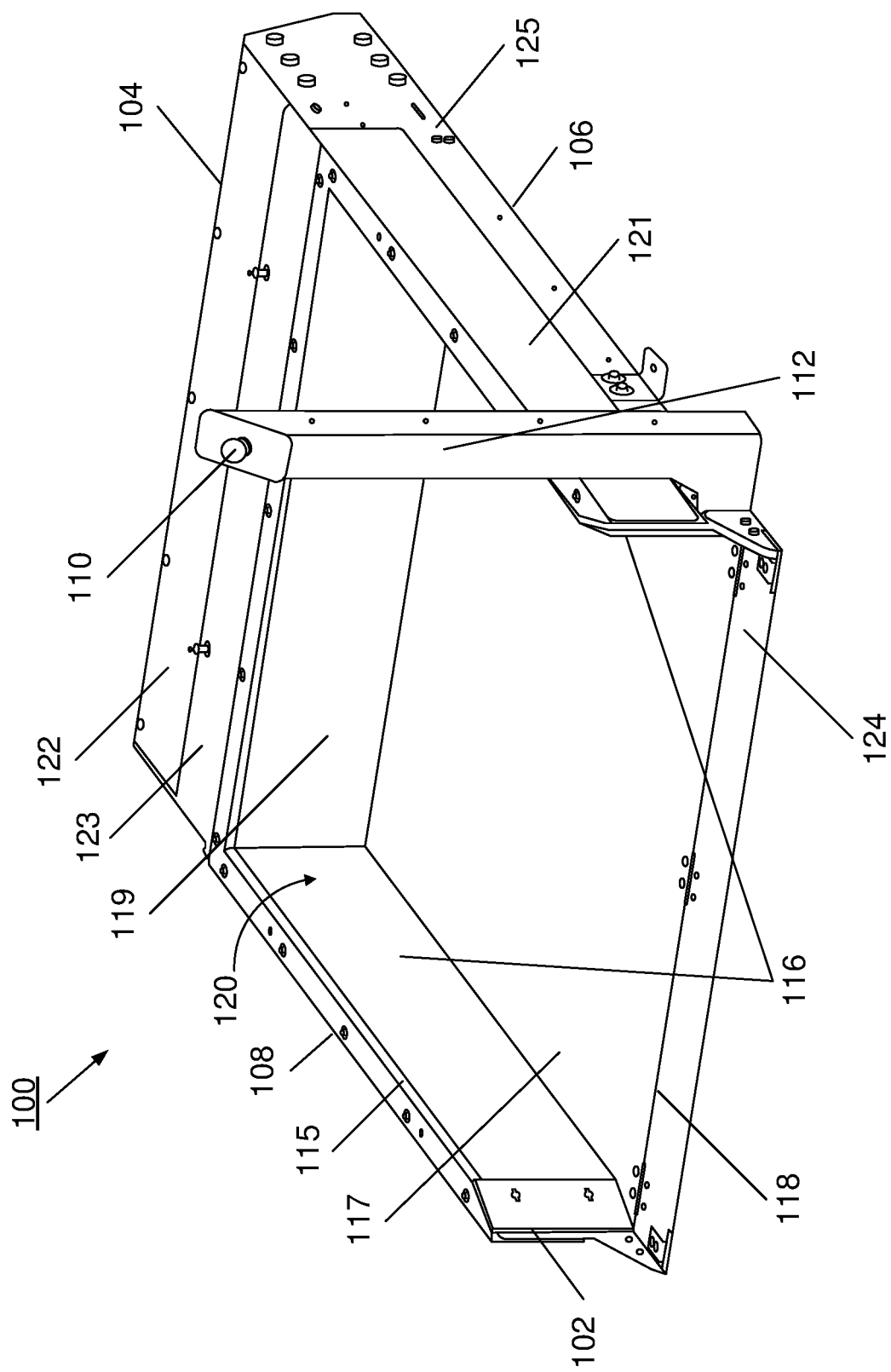
FIG. 1 is a perspective view of a first embodiment of the vibratory unit or compaction device of the present disclosure.

A more complete understanding of the components, processes, and devices disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named components/steps and permit the presence of other components/steps. However, such description should be construed as also describing systems or devices or processes as "consisting of" and "consisting essentially of" the enumerated components/steps, which allows the presence of only the named components/steps, along with any unavoidable results that might result therefrom, and excludes other components/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

Some terms used herein are relative terms. For example, the terms "upper" and "lower" or "base" are relative to each other in location, i.e. an upper component is located at a higher elevation than a lower or base component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "upwards" and "downwards" are also relative to an absolute reference; upwards is always against the gravity of the earth.

The term "perpendicular" is used in its lay sense of two planes that meet at substantially a right angle.

As used herein, the front and rear are located along an x-axis; the left and right sides are located along a y-axis; and upper and lower are located along a z-axis, wherein the three axes are perpendicular to each other.

The term "compaction" is used herein to refer to smaller items being packed more efficiently within a given volume, i.e. more compactly, and not in the sense of the initial volume of a smaller item being crushed to arrive at a smaller final volume.

The terms "small" and "large" are used herein as relative terms of size.

The present disclosure relates to vibratory units/compaction devices that are used to pack smaller items within a larger container more compactly. One conventional unit has an electric motor which moves a crank arm back and forth horizontally, helping to "slide" smaller items into a more dense configuration. This motion is only in the horizontal plane, with no vertical component. Other conventional vibratory equipment provide only vertical linear motion, with no horizontal component. In conventional vibratory tables, the movement is also consistent from side to side and front to back, with the same stroke (vertical displacement) being generated at all points on the table top.

In the vibratory units/compaction devices of the present disclosure, both horizontal motion and vertical motion are generated. In addition, the vertical component of the stroke varies from the front end to the rear end of the unit. This addresses asymmetrical loading which can occur. Generally, a larger stroke occurs towards the front end of the unit to help "toss" the smaller product within a larger container upward and towards the rear end of the unit. This type of motion also includes a horizontal displacement component directed towards the rear end of the unit, causing the larger container (i.e. a large box) on the unit to move via vibration toward the rear end of the unit, which is closed off. This acts as an additional safety feature as the larger container does not "walk" off the unit, as can happen when only vertical motion of the compaction device occurs. There is thus no need to strap or lock the larger container in place or otherwise constrain the larger container on all four sides, which would interfere with ease of loading and unloading the empty and full containers.

FIG. 1 is a perspective view of a first embodiment of a compaction device 100 of the present disclosure. The device 100 generally includes two primary structures, including a movable upper structure 115 and a stationary base structure 125. The upper structure is configured to hold a container. As described in further detail below, a connection arrangement between the upper and base structure 115, 125 permits movement of the upper structure relative to the stationary base.

Referring now to FIG. 1, the compaction device 100 is intended to rest on a flat surface. The device includes a front end 102, opposing rear end 104, first side 106, and opposing second side 108. These terms are also used to refer to the ends and sides of the upper structure 115 and the stationary base structure 125.

The movable upper structure 115 includes a floor 117 and three vertical sidewalls. Two of the sidewalls 116 are located along the first side 106 and the second side 108. The third sidewall or rear sidewall 119 of the upper structure is located along the rear end of the upper structure. There is no sidewall along the front end 118 of the upper structure. Thus, the front end of the upper structure and the overall device can also be referred to as a "loading end" or an "open end". Similarly, the rear end of the upper structure and the overall device can be referred to as a "non-loading end or a "closed end". Instead, a toe guard 124 is located on the front end 118 of the upper structure. The toe guard hangs down a sufficient distance to cover any space between the upper structure and the stationary base structure.

The floor 117 and three sidewalls 116, 119 surround and define a storage volume 120. The storage volume 120 is generally sized to accommodate standard pallet sizes with a footprint of 40 inches by 48 inches, but the storage volume can be sized smaller or larger to accommodate different pallet and/or container sizes.

Continuing in FIG. 1, the stationary base structure 125 extends beyond the rear sidewall 119 of the upper structure. Put another way, the stationary base structure has a larger footprint or plan area than the upper structure. The front ends of the stationary base structure and the upper structure are aligned with each other. A protective cover 122 and flexible guard 123 extend rearward from the rear sidewall 119 toward the rear end 104 of device 100. The cover 122 and flexible guard 123 provide protection for actuators, controls, and/or any other potentially sensitive equipment which may be located at the rear end of the stationary base structure. Moreover, the cover 122 and flexible guard 123 help reduce or eliminate pinch points around the unit.

Side guards 121 are also illustrated, which can be attached to either the sidewalls 116 of the upper structure 115 or to the stationary base structure, as will be seen further below.

Finally, a pushbutton 110 is used to control the motion of the upper structure 115. As illustrated here, the pushbutton 110 is mounted on top of a support post 112 located on the first side 106 of the device near the front end 102. The support post has a height which is greater than the height of the device. In this regard, the pushbutton is generally ergonomically located so that the associate/user does not have to bend over to push it, while the device is only as tall as needed to accomplish the rocking motion described later herein.

Figure 2:
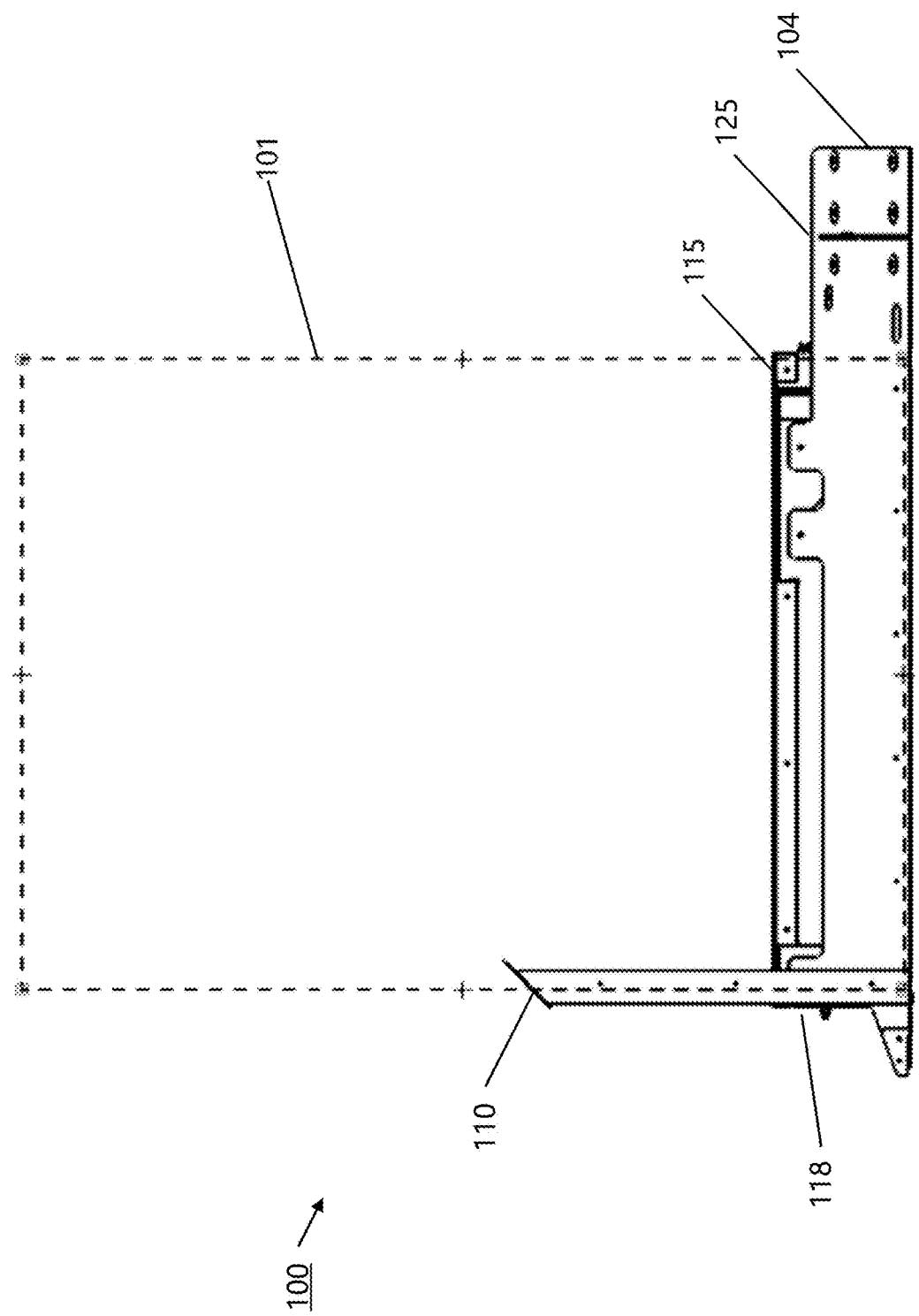
FIG. 2 is a side view of the compaction device of FIG. 1, illustrating how a large container is placed on the compaction device.

FIG. 2 is a side view that illustrates the use of a large container 101 with the compaction device 100. The larger container 101 is located within the storage volume of the upper structure, and is proximal the front end/loading end 118 of the upper structure. The remainder of the stationary base 125 at the rear end 104 of the device is also visible, as is the pushbutton 110.

Figure 3:
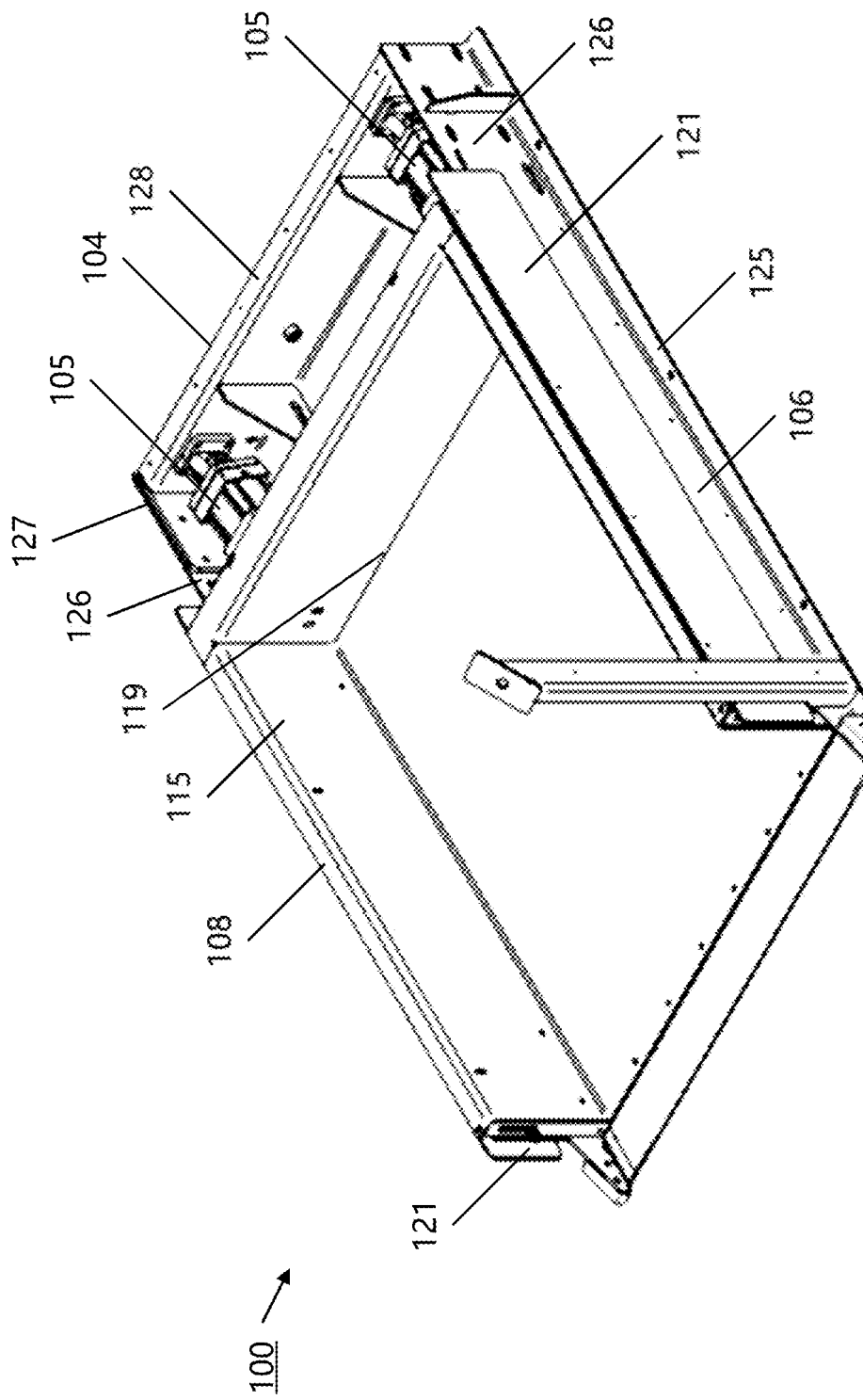
FIG. 3 is a perspective view of the compaction device of FIG. 1, with a protective cover of the rear housing removed and showing the actuators.

Continuing with FIG. 3, additional internal components of the compaction device 100 are visible. The stationary base structure 125 includes a housing 127 formed by two sidewalls 126 and a rear wall 128 disposed perpendicularly between the sidewalls on the rear side 104. The two sidewalls 126 extend along the first and second sides 106,108 of the device. The upper structure 115 is located between the two sidewalls 126. The protective cover (122) and flexible guard (123) shown in FIG. 1 can be attached to the sidewalls 126 and/or rear wall 128.

Referring back to FIG. 3, as illustrated here, the side guards 121 are attached to the upper structure 115, such that the sidewalls 126 of the stationary base structure are located between the upper structure and the side guards 121. The side guards 121 generally extend the length of the upper structure 115 to protect users from trapping their hands between the upper structure and the stationary base structure.

Also visible are two actuators 105 disposed within the housing 127 at the rear end 104 of device 100. In this embodiment, the actuators 105 are attached to the rear sidewall 119 of the upper structure. They are attached proximate the first side 106 and second side 108 of the rear sidewall. The actuators are used to move the upper structure horizontally back-and-forth between the front end and the rear end of the device. This force causes the moving upper structure 115 to undergo a rocking motion. In turn, this rocking motion causes settling of the smaller material or packages stored in the large container placed on the upper structure 115. In particular embodiments, as described herein, the actuators are pneumatic cylinders operated by air pressure. However, other types of actuators are also contemplated, such as hydraulic cylinders.

Figure 4:
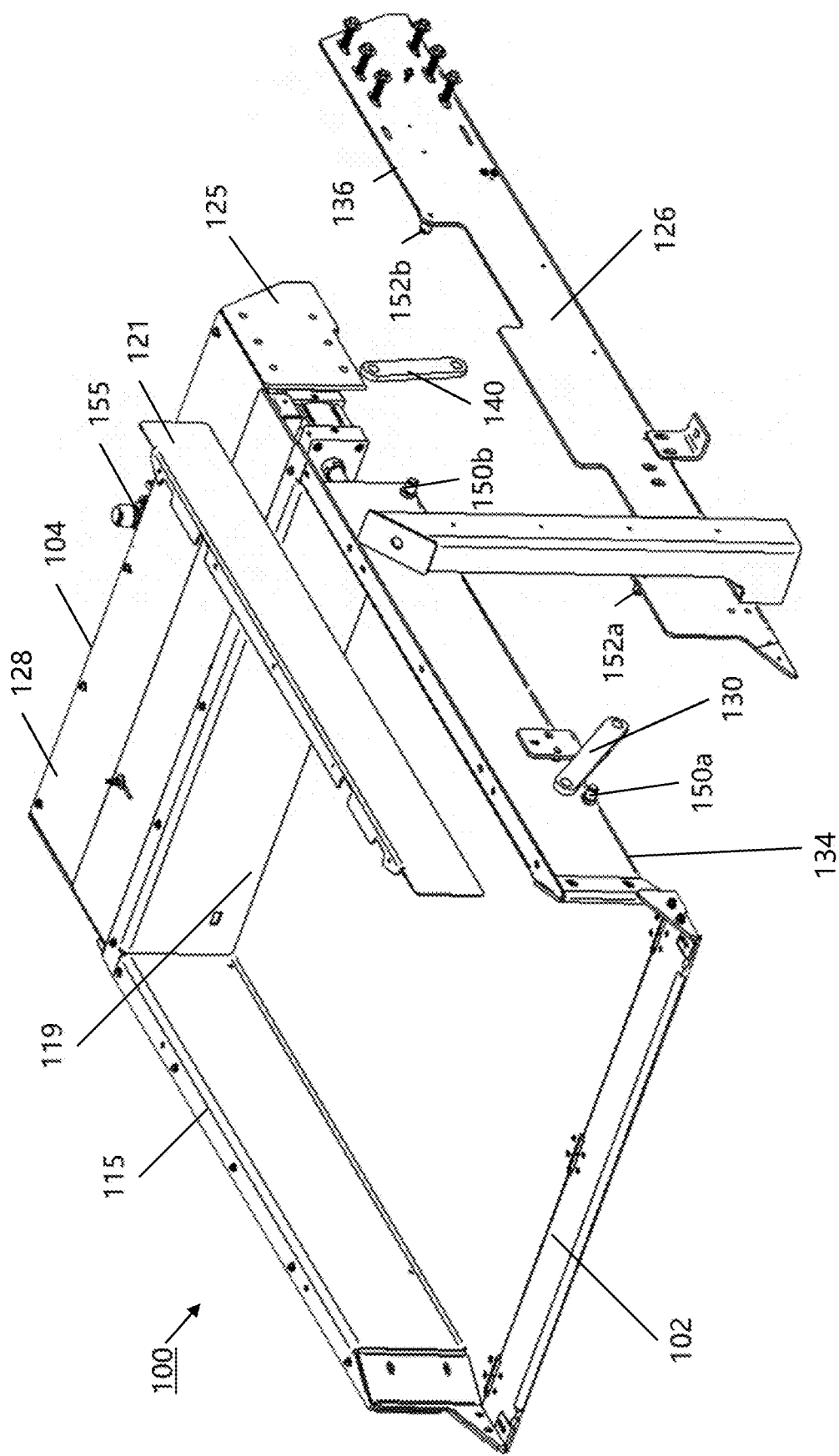
FIG. 4 is a partially exploded view of the compaction device of FIG. 1, showing several internal components and the relationship between these components.

Turning now to FIG. 4, this partially exploded view of the compaction device 100 permits a more detailed explanation of the mechanical connection arrangement between the moving upper structure 115 and the stationary base structure 125. A side guard 121 has been separated from the upper structure 115 and lifted up. A sidewall 126 has been separated from the stationary base 125 and moved outwards. A control system 155 is also visible along the rear wall 128 of the stationary base structure, which will be further explained later.

The mechanical connection arrangement includes two pivot linkage arms are located on both sides of the device (only one side is depicted here). There are two front end pivot linkages 130 (one on each of first and second sides of the device); and two rear end pivot linkages 140 (one on each of the first and second sides of the device). These linkages suspend the upper structure 115 above the ground. Relative location, length, and orientation of the linkages 130, 140 change the displacement/range of motion of the moving upper structure 115 relative to the stationary base structure 125. The front end pivot linkages 130 have a different length from the rear end pivot linkages 140.

As seen here, the upper structure 115 includes at least two connectors 150 located along a lower edge 134, one connector 150a proximate the front end 102 and one connector 150b proximate the rear end 104 or the rear sidewall 119. The stationary base structure 125 also includes at least two connectors 152 located along an upper edge 136, one connector 152a proximate the front end 102 and one connector 152b proximate the rear end 104. The front end pivot linkage 130 is connected to the connectors 150a, 152a proximate the front end, and can rotate around the connectors. The rear end pivot linkage 140 is connected to the connectors 150b, 152b proximate the rear end, and can rotate around the connectors. If desired, additional connectors could be present, and the linkages could be moved between connectors as desired to obtain the desired displacement/range of motion for a given load. The stationary base structure 125 is thus connected to the upper structure 115 through the front end pivot linkage 130 and the rear end pivot linkage 140.

Figure 5:
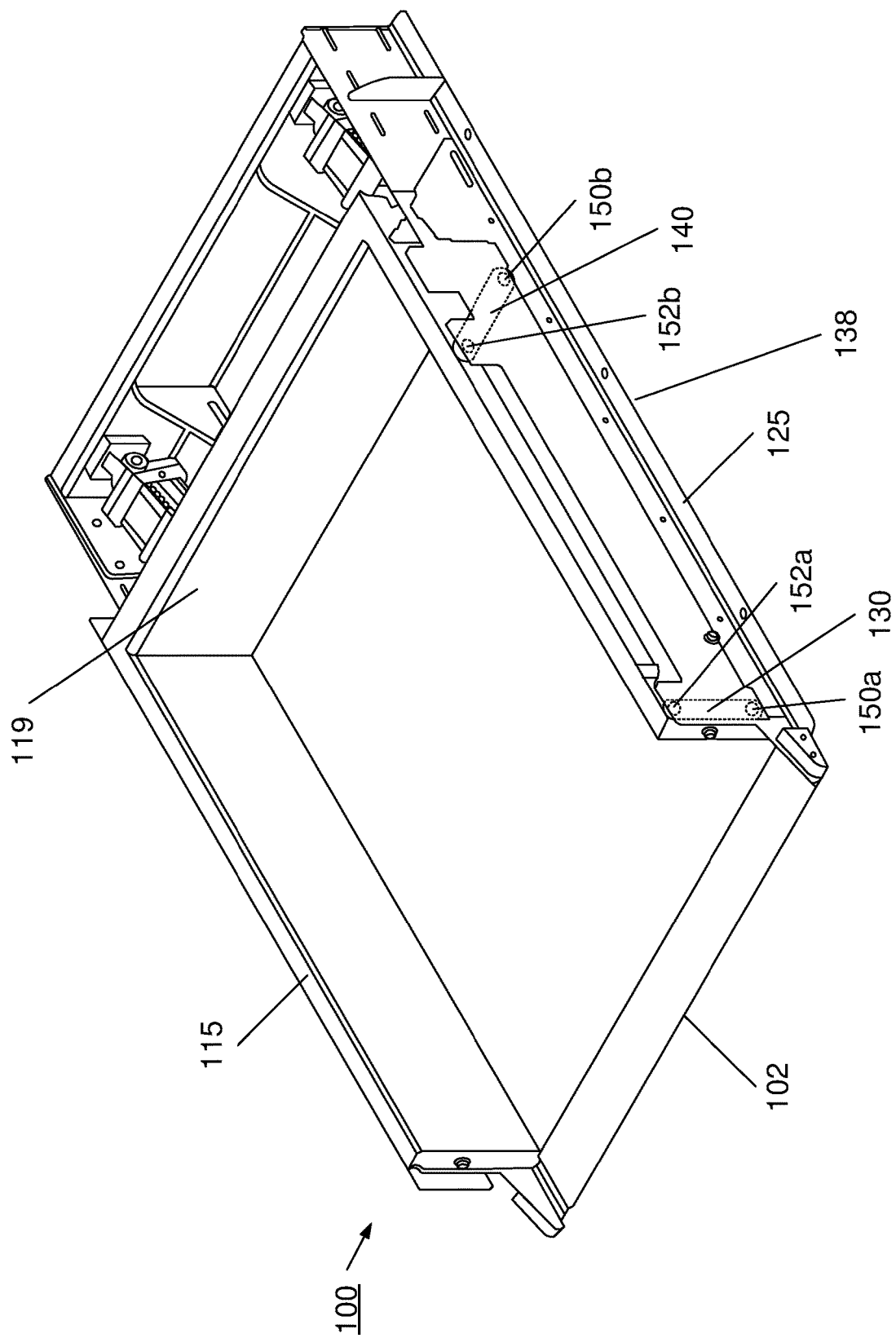
FIG. 5 is a perspective view of the compaction device of FIG. 1, also illustrating several internal components and the relationship between these components.
Figure 6:
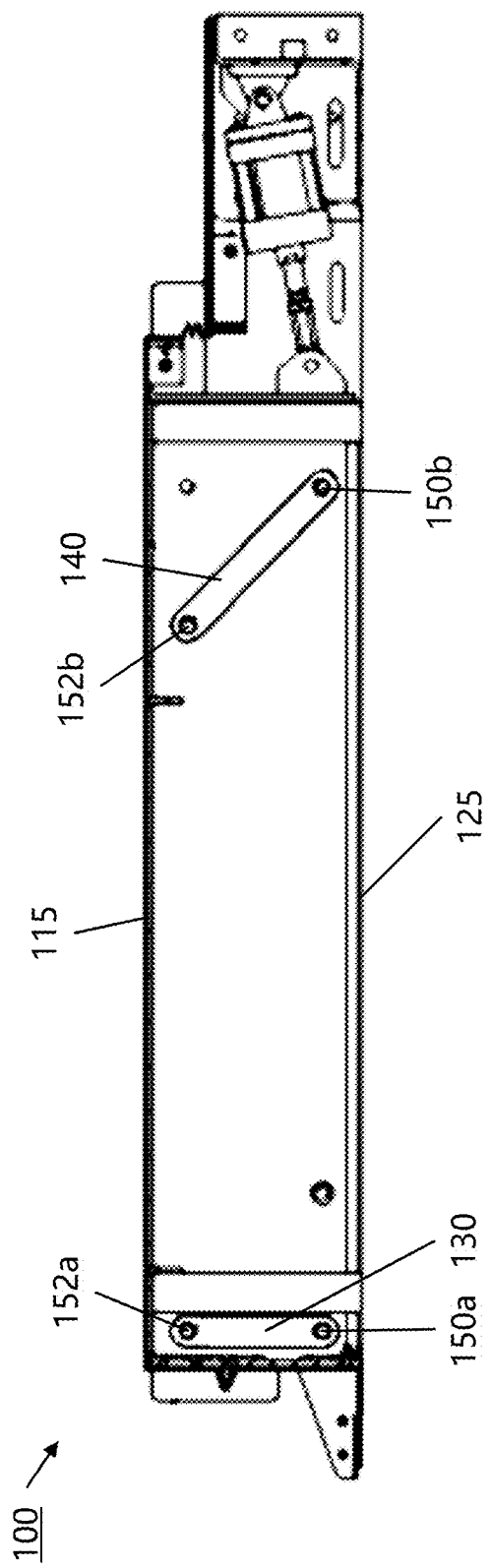
FIG. 6 is a side cutaway view of the compaction device of FIG. 1, illustrating several internal components and the relationship between these components.
Figure 7:
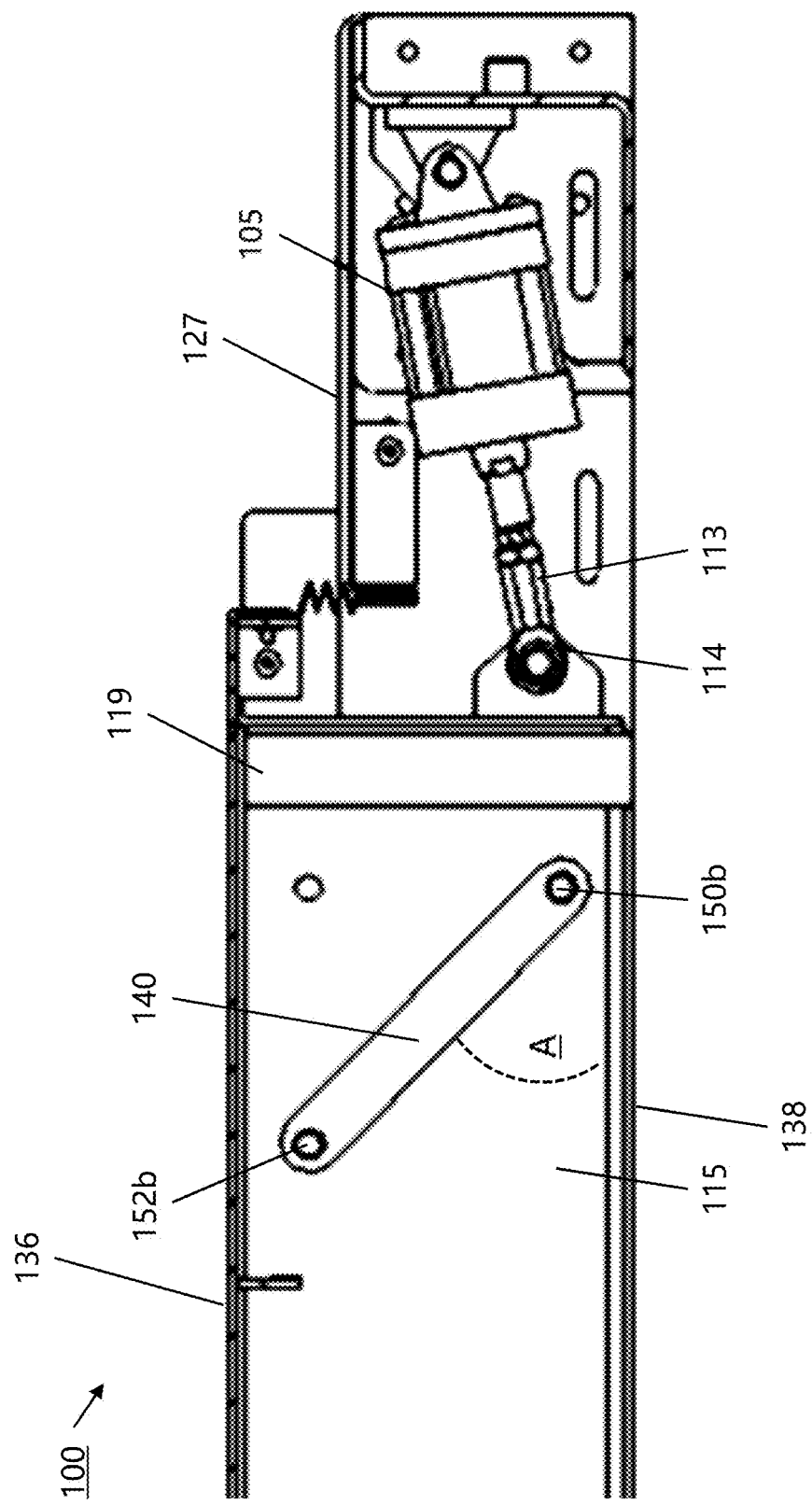
FIG. 7 is a magnified view of a rear portion of the view of FIG. 6.

FIGS. 5-7 illustrate one embodiment of the relative arrangement of the connectors 150, 152 on the movable upper structure 115 and the stationary base structure 125. FIG. 5 is a perspective view, FIG. 6 is a side view, and FIG. 7 is a magnified side view.

Referring to FIG. 5 and FIG. 6, the device 100 is shown in a resting position. The connector 152a is located above connector 150b, such that the front end pivot linkage 130 has a longitudinal axis perpendicular to a lower edge 138 of the base structure. The connector 152b is displaced closer to the front end 102 than connector 150b. Put another way the two connectors 150b, 152b are horizontally displaced or horizontally offset from each other in the resting position. As a result, the rear end pivot linkage 140 has a longitudinal axis that forms an acute angle with the lower edge 138 of the base structure. Here, the front end pivot linkage 130 is shorter than the rear end pivot linkage 140.

It is also contemplated that this arrangement could be reversed. Instead, the rear end pivot linkage 140 could have a longitudinal axis perpendicular to a lower edge 138 of the base structure, and the front end pivot linkage 130 could have a longitudinal axis that forms an acute angle with the lower edge 138 of the base structure. In this case, then, the front end pivot linkage 130 is longer than the rear end pivot linkage 140.

Referring now to FIG. 7, additional detail is visible. The upper edge 136 and the lower edge 138 of the stationary base structure are identified. Again, the connector 152b is horizontally displaced from connector 150b. As a result, the rear end pivot linkage 140 has a longitudinal axis that forms an acute angle A with the lower edge 138 of the base structure. Also illustrated here is actuator 105 within housing 127. The actuator is connected to the rear sidewall 119 of the upper structure through a lubrication-free ball joint rod 113 and a pin 114. Again, the actuator(s) 105 provide(s) the force which causes the moving upper structure 115 to undergo a rocking motion. In turn, this rocking motion causes settling of the material or packages stored in the container placed on the upper structure 115. The actuators(s) 105 thus convey motion to the upper structure 115.

Figure 8:
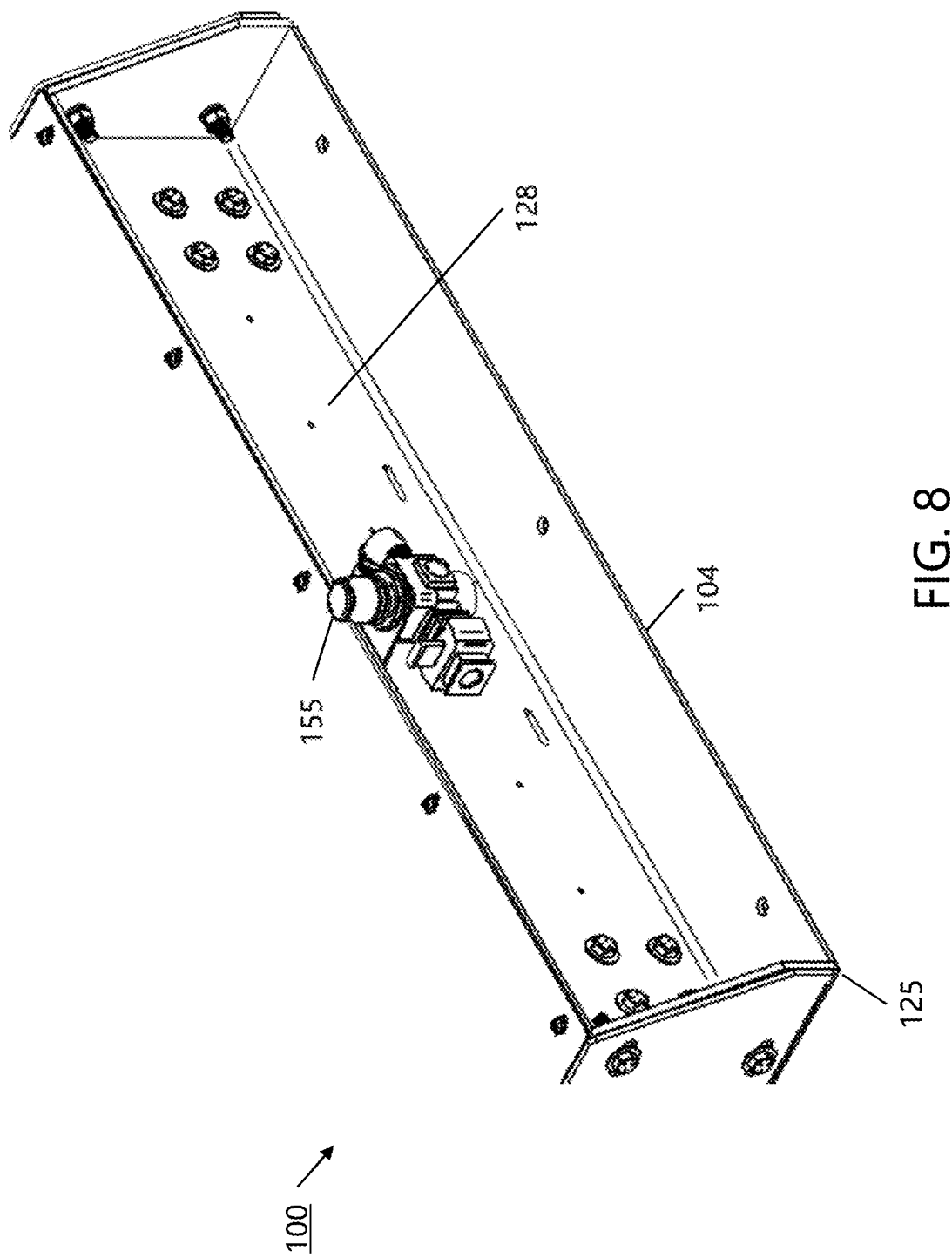
FIG. 8 is a rear perspective view of parts of a control system for use with the vibratory unit or compaction device of the present disclosure.

Turning now to FIG. 8, this is a view of the rear end of the stationary base structure 125. As illustrated here, a control system 155 is generally disposed at the rear side 104 of the device 100 and is mounted to at least a portion of the stationary base structure 125, such as rear wall 128. However, the control system 155 could be mounted to another component of the base structure 125 if desired.

Figure 9:
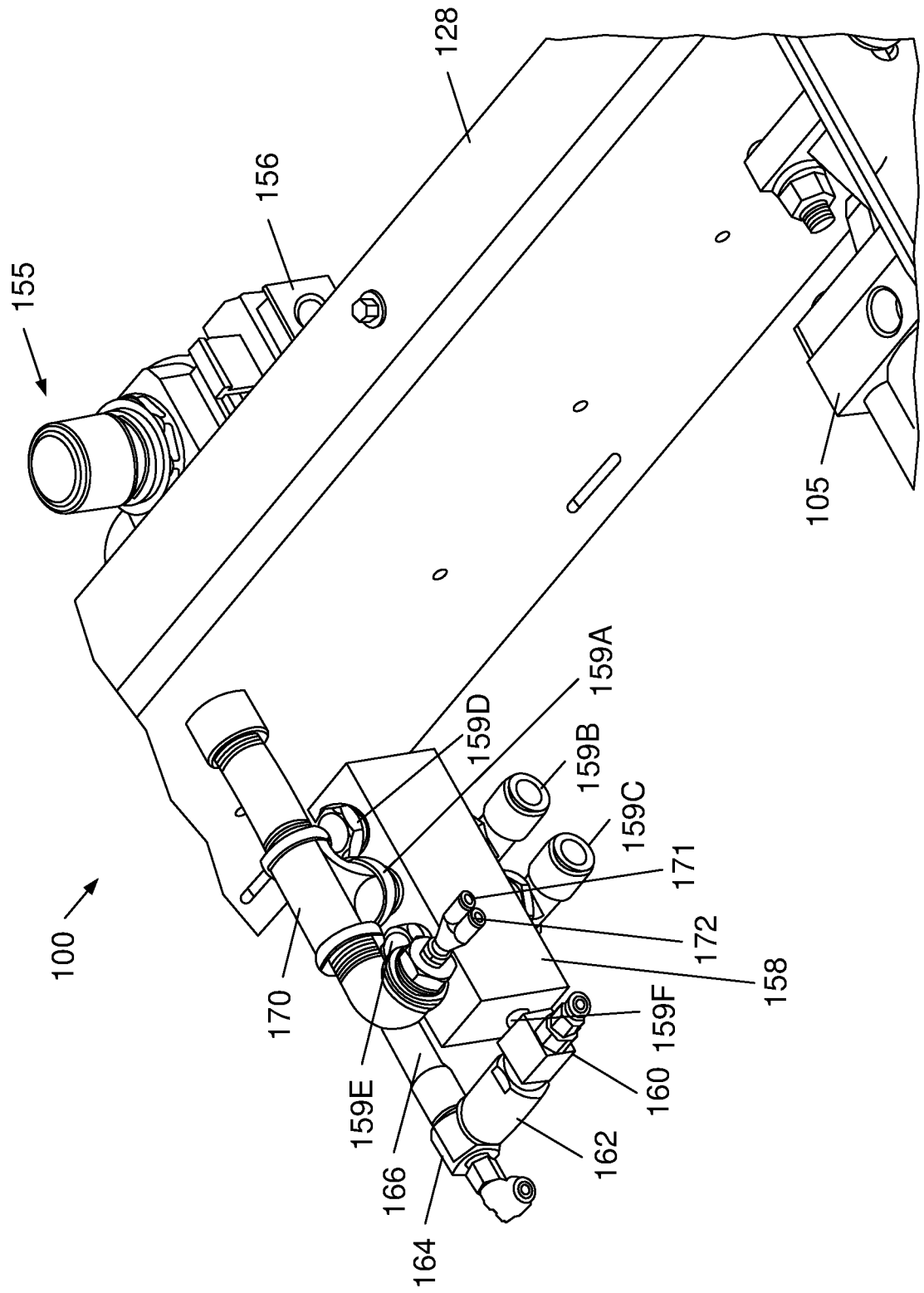
FIG. 9 is a perspective view of additional parts of the control system of FIG. 8.
Figure 10:
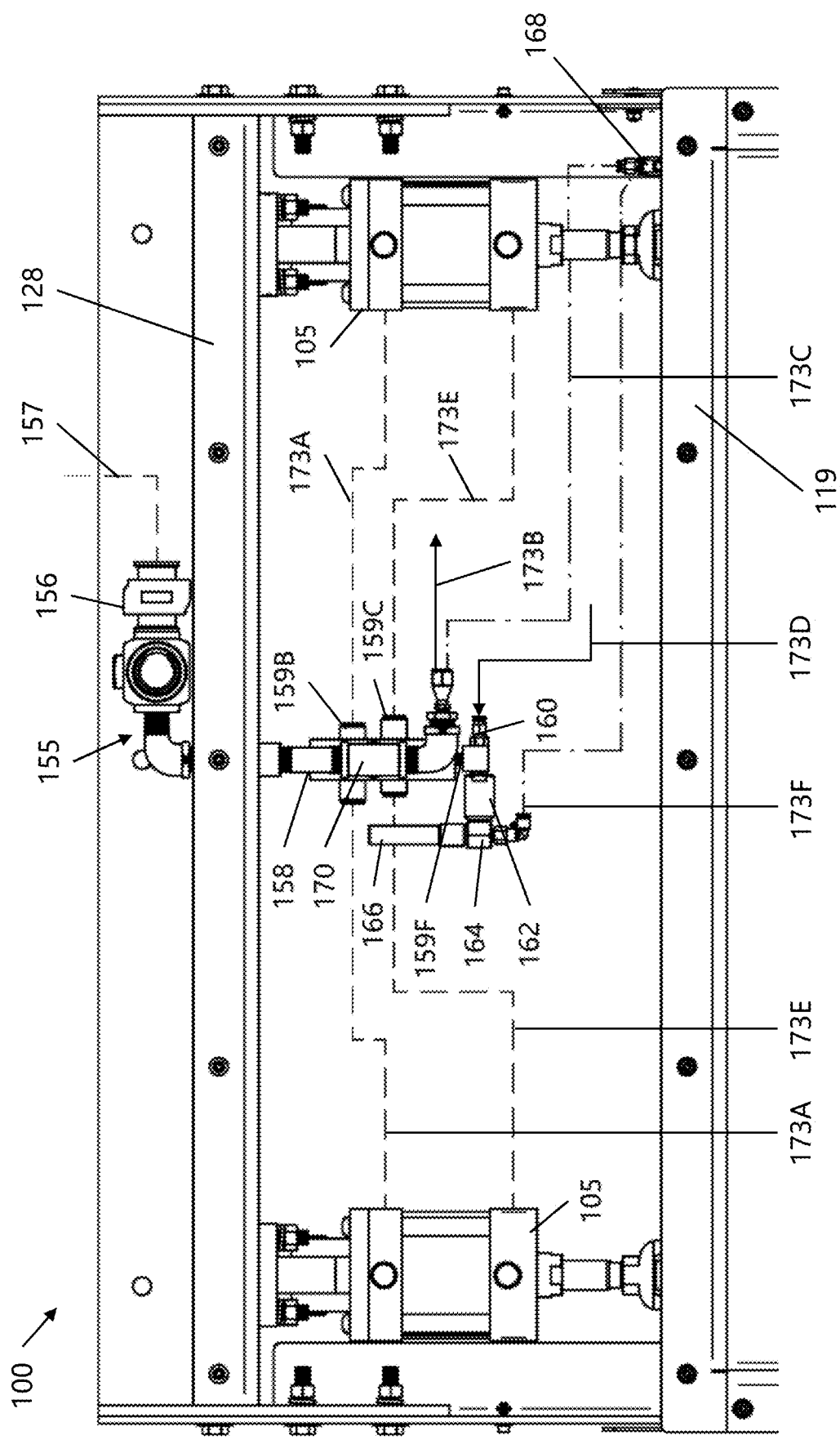
FIG. 10 is a plan view showing the control system of FIG. 8 within the rear housing of the vibratory unit or compaction device.

FIG. 9 is a perspective view of the control system 155. FIG. 10 is a plan view of the control system 155. Together, they show additional features and components of the system. Some of these components are described as being "normally open", meaning that in the resting or normal condition (i.e., without an outside signal or action), that device is "OPEN" to allow the free flow of fluid (e.g., air). When an outside signal or action is input, the normally open device closes and blocks the flow of fluid as long as the outside signal or action is maintained. Likewise, some components of the control system 155 are described as "normally closed", meaning that in the resting or normal condition the device is "CLOSED" to prevent fluid flow therethrough. When acted upon by a signal or mechanical action, a normally closed device opens and permits the flow of fluid as long as the signal or mechanical action is active. In the discussion below, the control system is described with reference to a pneumatic control system which uses air, but other fluids such as a liquid (e.g. a hydraulic control system) are also contemplated and the following discussion should be so interpreted.

Referring to FIG. 9 and FIG. 10 together, the control system 155 includes a supply valve 156 fluidly connected to a main supply line 157. The supply valve 156 thus receives and provides compressed air to the remaining components of the control system 155. The supply valve 156 extends through the rear wall 128 and connects to primary valve 158. The primary valve 158 is a 4-way, single air pilot operated valve having multiple ports 159A-159F for supplying and exhausting air. Port 159A is fluidly connected to supply valve 156 to receive air from the main supply line. Ports 159B and 159C are used to supply outbound air and are fluidly connected to corresponding ports of the actuators 105. Ports 159D and 159E are used to exhaust air from valve 158. Finally, port 159F is used to fluidly connect the primary valve 158 to a single acting air pilot actuator 162 described in greater detail below. When the device 100 is in a resting condition, air flows into primary valve 158 and exits first outbound port 159B. When the primary valve 158 receives an "air signal" from port 159F via pilot actuator 162, the primary valve shifts air from outbound port 159B to the other outbound port 159C. Compressed air will continue to flow out of outbound port 159C for as long as air is being applied to the pilot actuator port 159F. When the input air signal is removed from the pilot actuator 162, the primary valve 158 returns to its resting position and outbound air once again exits via outbound port 159B.

Next, the control system 155 includes a 3-way poppet valve 160 fluidly attached to the pilot actuator port 159F. The poppet valve 160 is normally open and is configured to receive the "air signal" generated when a user depresses the pushbutton 110. The poppet valve 160 then inputs air to the pilot actuator port 159F of the main valve 158.

As mentioned above, the control system 155 further includes single acting air pilot actuator 162. Pilot actuator 162 is used depress the stem (not shown) in 3-way poppet valve 160, thereby closing the poppet valve. The pilot actuator 162 receives its input "air signal" from a pulse valve 164 and depresses the stem of poppet valve 160. The pulse valve 164 is configured to close shortly after being pressurized and remain closed for a period of time thereafter. This time period is variable and is determined by the volume of air contained in the pulse valve volume chamber 166. In some embodiments, the length of time which the pulse valve 164 remains closed is from about 0.15 seconds to about 0.25 seconds, including a time period of about 0.21 seconds.

Referring specifically to FIG. 10, the control system 155 further includes a limit valve 168 which is generally mounted adjacent the rear sidewall 119 of the upper structure. The limit valve 168 is normally closed and is configured to detect the presence of an object which comes into contact with the limit valve. In other words, the limit valve 168 is configured to sense a change in position of the contacting object. In particular, when the upper structure 115 moves rearward, the upper structure contacts and depresses an extended post (not shown) on the limit valve 168. This contact between upper structure 115 and the post causes the limit valve 168 to open and permit air to flow therethrough. The limit valve 168 will remain as long as the extended post is depressed.

The operation of the vibratory unit or compaction device can now be described in greater detail. Referring first back to FIG. 2, a user loads a pallet and a large container 101 from the loading end 118 into the upper structure 115 of the device 100. The container 101 may already be relatively full or partially full of smaller units, and loaded onto the compaction device for compaction. Alternatively, the container 101 can be empty, and the container is loaded with smaller units while on the compaction device 100. The device 100 is designed to settle smaller units that have been asymmetrically loaded into the large container 101.

Referring now to FIG. 5, often, when loading smaller units into a large container, the smaller units "pile up" against one side of the large container. Put another way, the load of the smaller units is asymmetrically distributed across the footprint/area of the large container. When the device is activated to create horizontal and vertical motion, the relative lengths and angles of the pivot linkages 130, 140 will determine the amplitude of motion in the vertical direction. When a longer pivot linkage is oriented at an acute angle relative to a lower edge of the base structure 125 and a shorter pivot linkage is oriented perpendicular to the lower edge of the base structure 125, then this will create a larger amplitude of motion closer to the longer pivot linkage than the shorter pivot linkage.

In FIG. 5, where the rear end pivot linkage 140 is longer than the front end pivot linkage 130, it is expected that the large container would be loaded with the greater weight being placed closer to the rear sidewall 119 than the front end 102. This enhances worker safety, as the greater weight is concentrated closer to the center of gravity of the compaction device 100. The rear end of the upper structure will have a greater amplitude of motion, causing the smaller packages within the large container to settle faster and distribute towards the front end of the device. Placement of the pivot linkages 130, 140 is generally determined prior to shipment of the device 100 to the end user. Characteristics of load are discussed prior to final assembly of the device so appropriate pivot arm linkage placement can be made.

In some exemplary embodiments, the longer of the pivot linkages (e.g. rear end pivot linkages 140) can be configured to move the upper structure 115 a vertical distance of about 1 inch to about 3 inches, including a vertical distance of about 2.5 inches. The shorter of the pivot linkages (e.g., front end pivot linkages 130) can be configured to move the upper structure 115 a vertical distance of about ⅛ inch to about ½ inch, including a vertical distance of about ¼ inch.

Turning back to FIG. 2, the device 100 is activated by depressing a pushbutton 110 attached to a control system 155. Referring now to FIG. 9 and FIG. 10, in some implementations, the control system 155 is a pneumatic system. The pushbutton 110 includes an associated air valve (not shown) which opens when the pushbutton is depressed and remains open as long as the pushbutton is depressed. Depressing the pushbutton 110 opens the associated pushbutton valve and sends an "air signal" to the control system 155 (i.e., the pilot valve) which activates the actuators 105 located on the rear of the device 100. More particularly, the pistons of actuators 105 extend and retract based on the "air signal" received by the pilot valve control system.

It is contemplated that the control system could be configured so that the actuators extend and retract only once when the pushbutton is depressed. Thus, the device 100 would be an "on demand" device as opposed to a device which implements an automated process; and, in some embodiments, no electrical power is needed. The device 100 is powered by user supplied compressed air. In this regard, the user/operator determines when to activate the device by watching the smaller packages settle in the large container and continuing to activate the device 100 by pressing the pushbutton 110 if further settling is needed.

Alternatively, the control system could be configured so that the actuators extend and retract repeatedly while the pushbutton is depressed and return to a resting position when the pushbutton is released. Instead of including only a pneumatic pilot valve, the control system 155 includes various additional components in fluid communication with one another and with the actuators 105. In such implementations, the control system 155 and the additional components permit the device 100 to generate the specific motion of the upper moving structure 115 in a "semi-automated" manner. Such components are known in the art.

Continuing with reference to FIG. 5, FIG. 9, and FIG. 10, the pistons of actuators 105 are normally in the extended position, which corresponds to the upper structure 115 being level to the ground. When the pistons retract, the upper structure 115 moves upward and towards the rear. This tossing motion assists in leveling and compacting the material or in the upper structure 115. When the pushbutton 110 is released, the pistons of actuators 105 extend and cause the upper structure 115 to return to its start position level to the ground.

In the resting condition, with no outside interaction by a user/operator, air flows from the supply valve 156 through a "T" connector 170, which splits the flow in two directions. The first direction of flow is through port 159A, where air enters the primary valve 158 and is output to the first outbound port 159B. The first outbound port 159B supplies air to the rear of actuators 105 via conduit 173A. The supply air from conduit 173A to actuators 105 maintains the cylinder pistons in their extended position, which corresponds to the moving upper structure 115 being held in the down or loading position. The control system 155 is configured such that in the event of air escaping or being removed from the device 100, the pistons of cylinders 105 will not retract and the upper structure 115 will remain in the down or loading position.

The second direction in which "T" connector 170 splits air flow is to control outlets 171, 172. When the system is in the resting position, control outlet 171 supplies a constant stream of supply air to the pushbutton valve via conduit 173B. Since the pushbutton valve is normally closed, air is prevented from flowing through the pushbutton valve. Control outlet 172 supplies a constant stream of supply air to the limit valve 168 via conduit 173C. Limit valve 168 is also normally closed, thus air is also prevented from flowing through the limit valve.

When it is desired to commence the vibrating or rocking motion of the upper structure 115, the user/operator/associate depresses and holds down pushbutton 110. Depressing the pushbutton 110 causes the attached valve to change from its normally closed position to open, thereby permitting air to flow from control outlet 171 and though the pushbutton valve. The operator will continue to hold down pushbutton 110 during the entire desired vibration cycle period. An effective vibration cycle period which results in sufficient settling of the material or packages stored in the container is generally from about 4 second to about 10 seconds, including from about 5 seconds to about 6 seconds. This time period may increase or decrease depending on the type or size of the material/packages. These vibration cycles of about 4 seconds to about 10 seconds generally result an increase in effective container capacity of about 10% to about 30%, including from about 12% to about 20%.

When the pushbutton valve is open, an "air signal" is returned through conduit 173D and enters the 3-way poppet valve 160 attached to primary valve 158. The primary valve 158 receives the signal via pilot actuator port 159F, causing the primary valve to shift output air from the first outbound port 159B to the second outbound port 159C. The second outbound port 159C supplies air to the front of actuators 105 via conduit 173E, thereby pushing the piston to the retracted position. Air on the opposite or rear side of actuators 105 is exhausted through the exhaust ports 159D and 159E. The pneumatic cylinder 'pulls' the upper structure 115 rearward, thereby starting the "shake" cycle. As the cylinder piston moves to its retracted position, the connection arrangement provided by the loading and non-loading end linkages 130, 140 causes the upper structure 115 to begin its rocking motion. In particular, the front end 118 of upper structure 115 starts to dip and the rear sidewall 119 begins moving upward and to the rear.

With continued rearward movement, the back edge of the rear wall 128 eventually comes into contact with the limit valve 168. This contact depresses the stem on the normally closed limit valve 168 and moves the limit valve to the open position. The air then passes through the opened limit valve 168 to the pulse valve 164 via conduit 173F. The pulse valve 164 then supplies air to the single acting air pilot actuator 162 mounted to the 3-way poppet valve 160. This action closes the normally open poppet valve 160, thereby removing the input signal from the pushbutton valve.

When the normally open poppet valve 160 closes due to the input of the pulse valve 164, the "air signal" that causes the primary valve 158 to shuttle from port 159B to port 159C is lost. As a result, the primary valve 158 returns to its resting position where air flows out of outbound port 159B and to the rear of actuators 105 via conduit 173A. This action pushes the cylinder piston forward to the fully extended position and causes the upper structure 115 to move forward.

As the upper structure 115 moves forward, contact between the rear wall 128 and the limit valve 168 is lost. The limit valve 168 returns to its normally closed position and the flow of air to pulse valve 164 stops.

The pulse valve 164 and pulse valve volume chamber 166 are configured such that the 3-way poppet valve 160 remains closed for a short period of time. As mentioned above, the pulse valve 164 remains closed for about 0.15 seconds to about 0.25 seconds, including about 0.21 seconds. This allows the pistons of actuators 105 to continue forward to their extended position, even after the limit valve 168 returns to its normally closed condition and removes the input air to pulse valve 164.

When the pulse valve 164 "times out" and returns to its normal condition, the 3-way poppet valve 160 returns to its normally open position, thereby permitting the input of air from the pushbutton valve to the pilot actuator port 159F of the primary valve 158. The primary valve 158 shifts air from first outbound port 159B to second outbound port 159C, which again supplies air to the front of actuators 105 via conduit 173E. This causes the pistons of actuators 105 to retract and pull the upper structure 115 to the rear. The cycle repeats as long as the operator continues to hold down the pushbutton 110 and open the pushbutton valve.

When the operator removes pressure from the pushbutton 110, the pushbutton valve returns to its normally closed position and the input "air signal" supplied to the pilot actuator port 159F of the primary valve 158 is removed. The primary valve 158 returns to its resting position, where air flows to first outbound port 159B and the actuators 105 return to their fully extended position. The upper structure 115 comes to a rest on the floor, returning to the starting loading/unloading down position. The cycle is then complete.

For the entire duration which pushbutton 110 is depressed, the upper structure 115 essentially bounces between two positions automatically. This action generates the rapid motion and acceleration required to effectively compact the individual packages or material in the gaylord. The furthest rearward position is determined by the placement of the limit valve 168. The return movement toward the forward position is determined by the length of time that the pulse valve 164 "blocks" the input air from the pushbutton valve to the pilot actuator port 159F on the primary valve 158. During the shake/vibration cycle, the upper structure 115 never fully returns to its resting loading/unloading position. As a result, the upper structure 115 is prevented from impacting the ground during the shake/vibration cycle.

Figure 11:
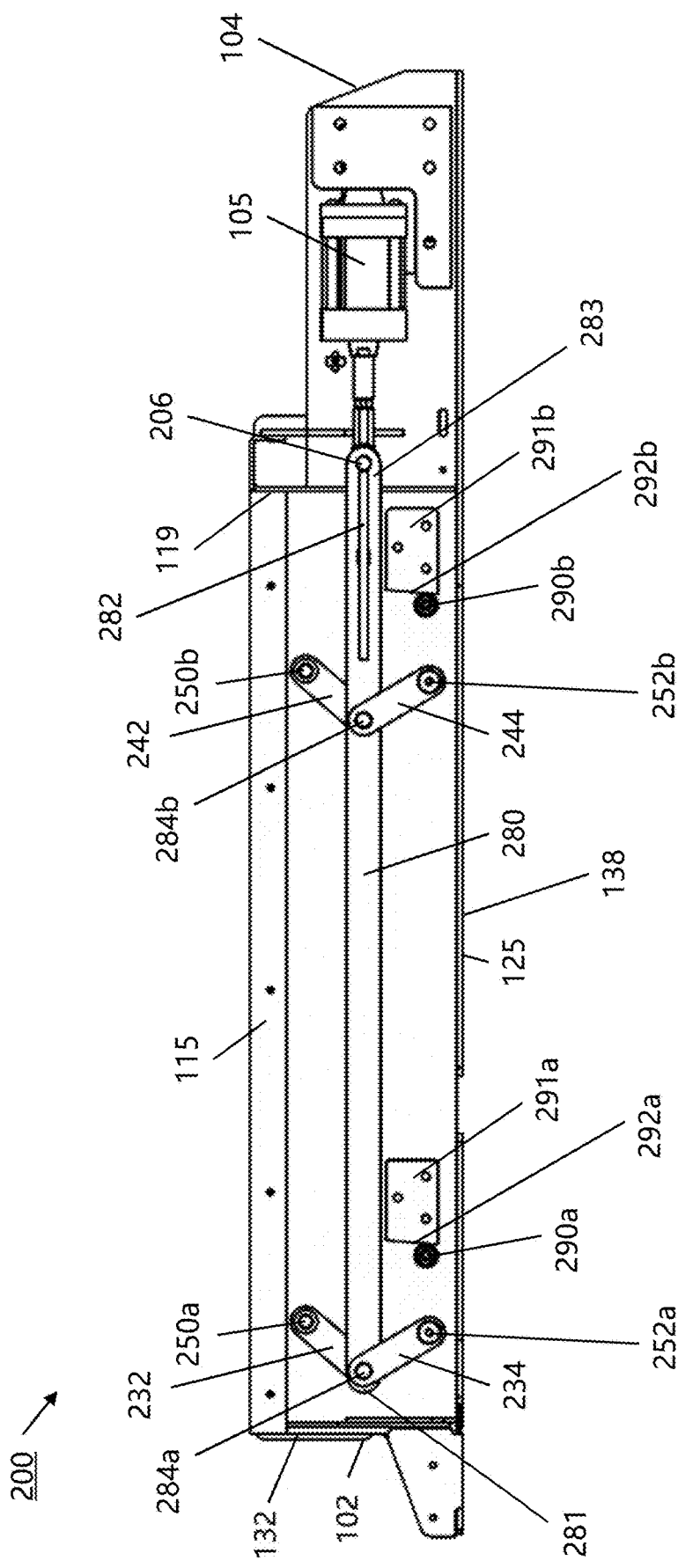
FIG. 11 is a side view of a second embodiment of the vibratory unit or compaction device of the present disclosure, which has different linkages between the internal components compared to the first embodiment as seen in FIG. 4.
Figure 12:
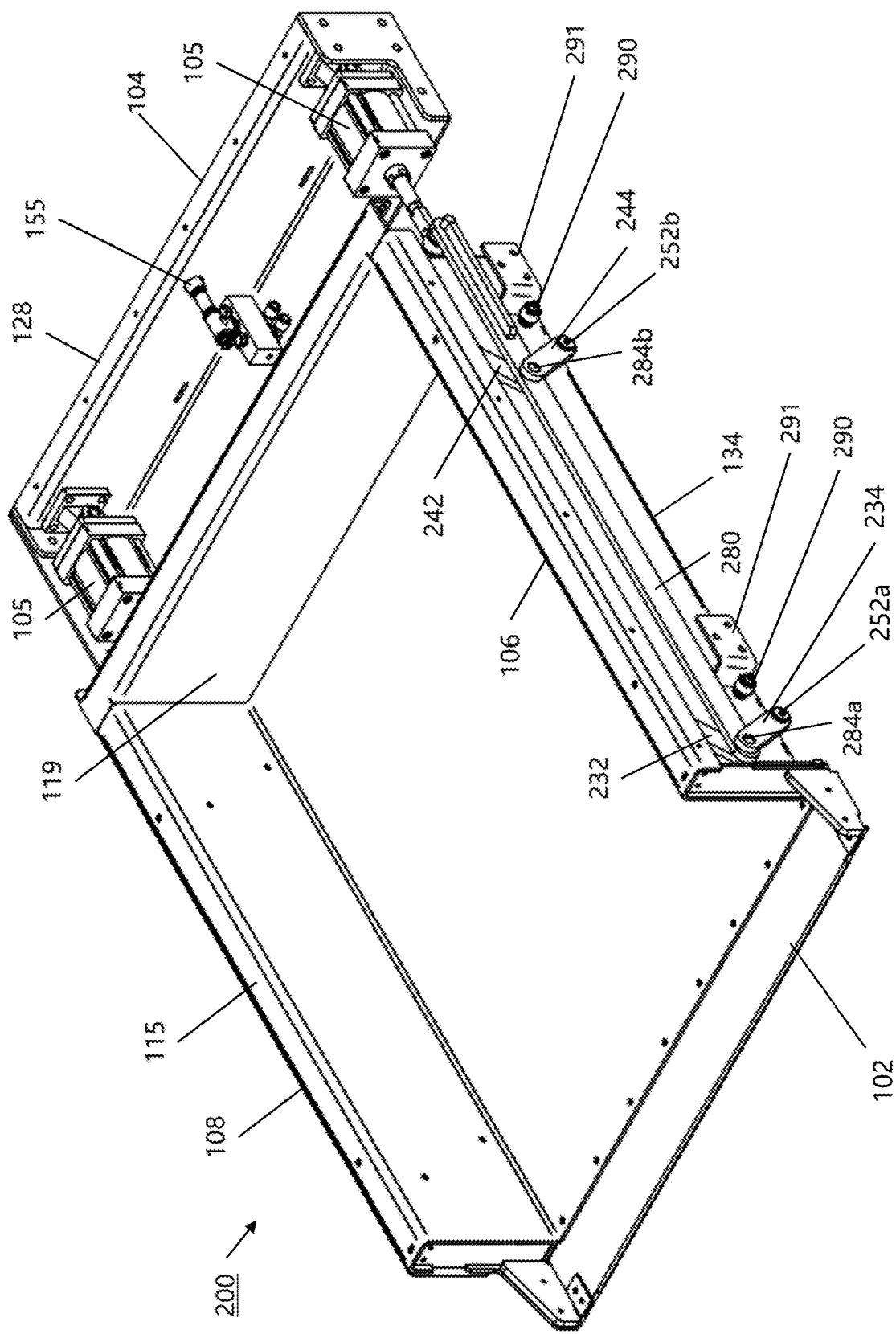
FIG. 12 is a front perspective view of the second embodiment of FIG. 11.
Figure 13:
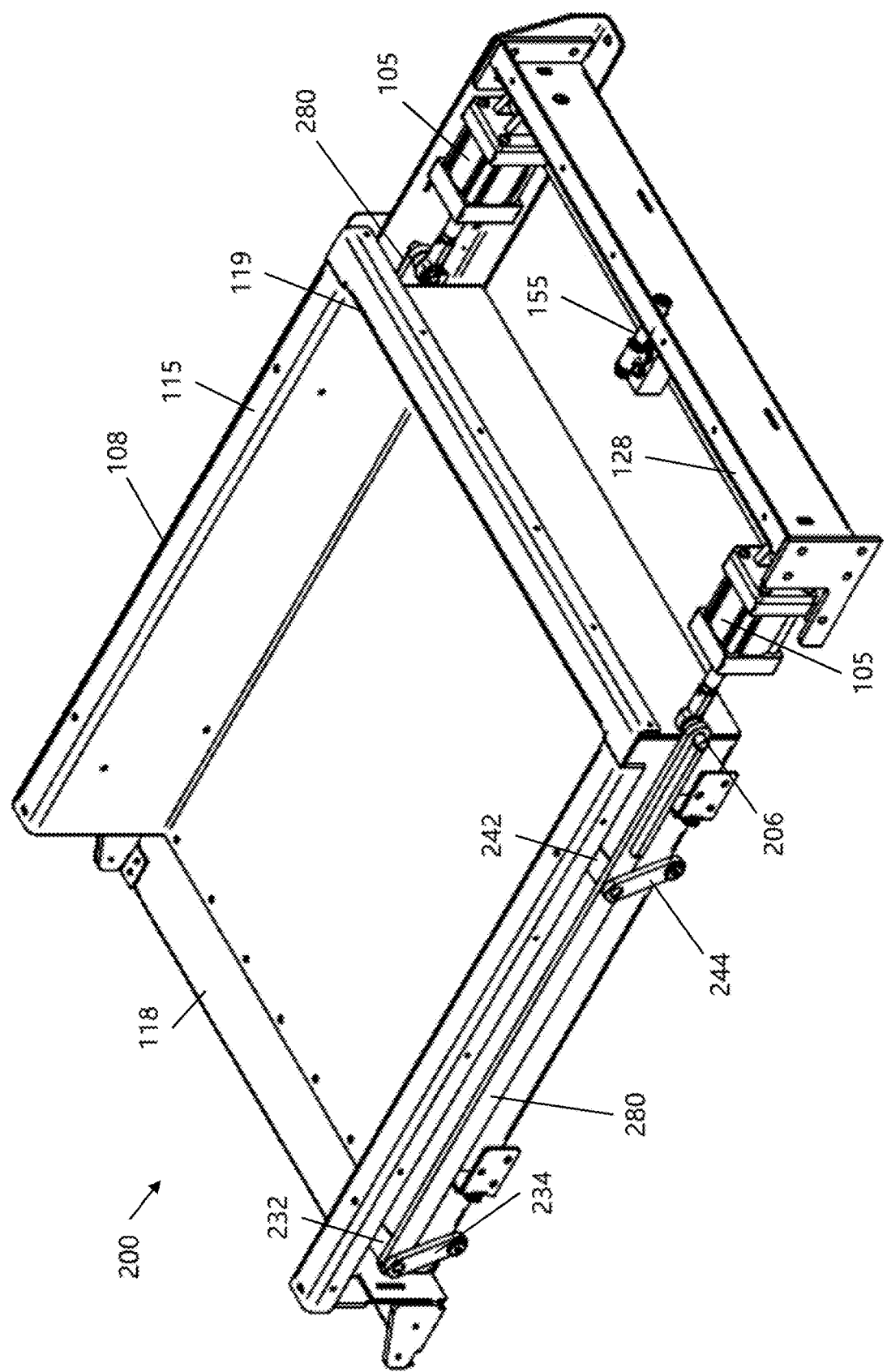
FIG. 13 is a rear perspective view of the second embodiment of FIG. 11.

FIGS. 11-13 illustrate a second embodiment of the vibratory unit or compaction device of the present disclosure, which has different linkages between the internal components compared to the first embodiment illustrated in FIG. 4. FIG. 11 is a side view. FIG. 12 is a front perspective view. FIG. 13 is a rear perspective view. These figures reveal the linkages in a resting condition, and do not include the sidewalls 126 of the stationary base 125 or the side guards 121 of the upper structure 115.

Referring first to FIG. 11, the compaction device 200 still includes an upper structure 115 and a stationary base structure 125 as previously described. The compaction device also includes a front (or load) end 102 and opposing rear (or non-loading) end 104 as previously described. The rear sidewall 119 of the upper structure is also included as a reference point.

The stationary base structure 125 is connected to the upper structure 115 through a set of toggle pivot linkages and a pull arm 280 on each side of the stationary base. Initially, the pull arm 280 extends the length of the upper structure 115. The pull arm has a front end 281 and a rear end 283. A longitudinal slot 282 is present at the rear end 283. The actuator 105 engages the pull arm 280 with a pin 206 through the slot. The pull arm connects to the toggle pivot linkages through connectors 284 located at two different points, a front connector 284a near the front end 281 and a rear connector 284b located between the front connector and the longitudinal slot 282.

Continuing in FIG. 11, the upper structure 115 includes at least two connectors 250 located along an upper edge 132, one connector 250a proximate the front end 102 and one connector 250b proximate the rear end 104 or the rear sidewall 119. The stationary base structure 125 also includes at least two connectors 252 located along a lower edge 138, one connector 252a proximate the front end 102 and one connector 252b proximate the rear end 104.

Four different toggle pivot linkages are present. Front end upper toggle pivot linkage 232 is connected to upper structure connector 250a and pull arm front connector 284a, and rotates about the connectors. Rear end upper toggle pivot linkage 242 is connected to upper structure connector 250b and pull arm rear connector 284b, and rotates about the connectors. Front end base toggle pivot linkage 234 is connected to stationary base structure connector 252a and pull arm front connector 284a, and rotates about the connectors. Rear end base toggle pivot linkage 244. is connected to stationary base structure connector 252b and pull arm rear connector 284b, and rotates about the connectors.

It is noted that in the illustrated resting position, the pull arm connectors 284 are horizontally offset from the upper structure connectors 250 and the stationary base connectors 252. In the resting position, the upper structure connectors 250 are usually located above the stationary base connectors 252, but can be horizontally offset therefrom.

The upper toggle pivot linkages 232, 242 have the same length as each other. The base toggle pivot linkages 234, 344 also have the same length as each other, and can have a different length from the upper toggle pivot linkages. However, in particular embodiments, the four different toggle pivot linkages 232, 234, 242, 244 are of equal length.

Operation of the device 200 can be controlled by the control system 155 as described above. As actuator 105 retracts, the pull arm 280 is pulled rearward, causing the toggle pivot linkages 232, 234, 242, 244 to lift the upper structure 115. Mechanical advantage is attained because the force applied by the actuator 105 to lift the upper structure is multiplied. Put another way, the upper structure is lifted vertically by a greater distance than the pull arm travels horizontally.

The motion of the upper structure 115 can be guided by one or more cam followers 290 (rollers). As illustrated in FIG. 11, there are two cam followers, a primary cam follower 290a proximate the front end 102 and a secondary cam follower 290b proximate the rear end 104. Each cam follower 290 engages a cam 291. Here, primary cam follower 290a engages primary cam 291a proximate the front end 102 and secondary cam follower 290b engages primary cam 291b proximate the rear end 104. Each cam follower 290a, 290b moves along a surface 292a, 292b of the cam 291a, 291b.

Each cam surface 292a, 292b forms an angle of about 60° to 88° with the lower edge 138 of the stationary base structure. Generally, the angle is the same for both cam surfaces 292a, 292b, but some embodiments are contemplated where the angle is different for the two cam surfaces. The angle of the cam surface controls the horizontal movement of the upper structure 115.

As better seen in FIG. 12 and FIG. 13, it is contemplated that the cam followers 290 are attached to a lower edge 134 of the upper structure 115, and the cams 291 are attached to a lower edge of the stationary base structure. However, this arrangement can also be reversed if desired.

In these two figures, the rear wall 128 of the housing and the actuators 105 are also more visible. It is also more clear that the upper toggle pivot linkages 232, 242 are on opposite sides of the pull arm 280 from the base toggle pivot linkages 234, 344.

FIG. 13 also makes more visible the second pull arm 280 on the second side 108 of the device 200. The pin 206 joining the actuator 105 to the pull arm 280, and passing through the longitudinal slot 282, is also more easily seen.

It is also noted that in the second embodiment of FIG. 11, the resulting motion of the upper structure is linear, in the direction of the cam surfaces 292a, 292b. In contrast, the upper structure has a swinging or arc-like motion in the first embodiment of FIG. 5. Such linear motion can be more beneficial in compacting loose bulk material.

Another mechanical advantage of the second embodiment of FIG. 11 is more acceleration imparted to the container and smaller items therein, resulting in more effective packing and consolidation. Furthermore, it should be noted that the motion will be the same front to back so long as the cam surfaces 292a, 292b have the same angle.

Figure 14:
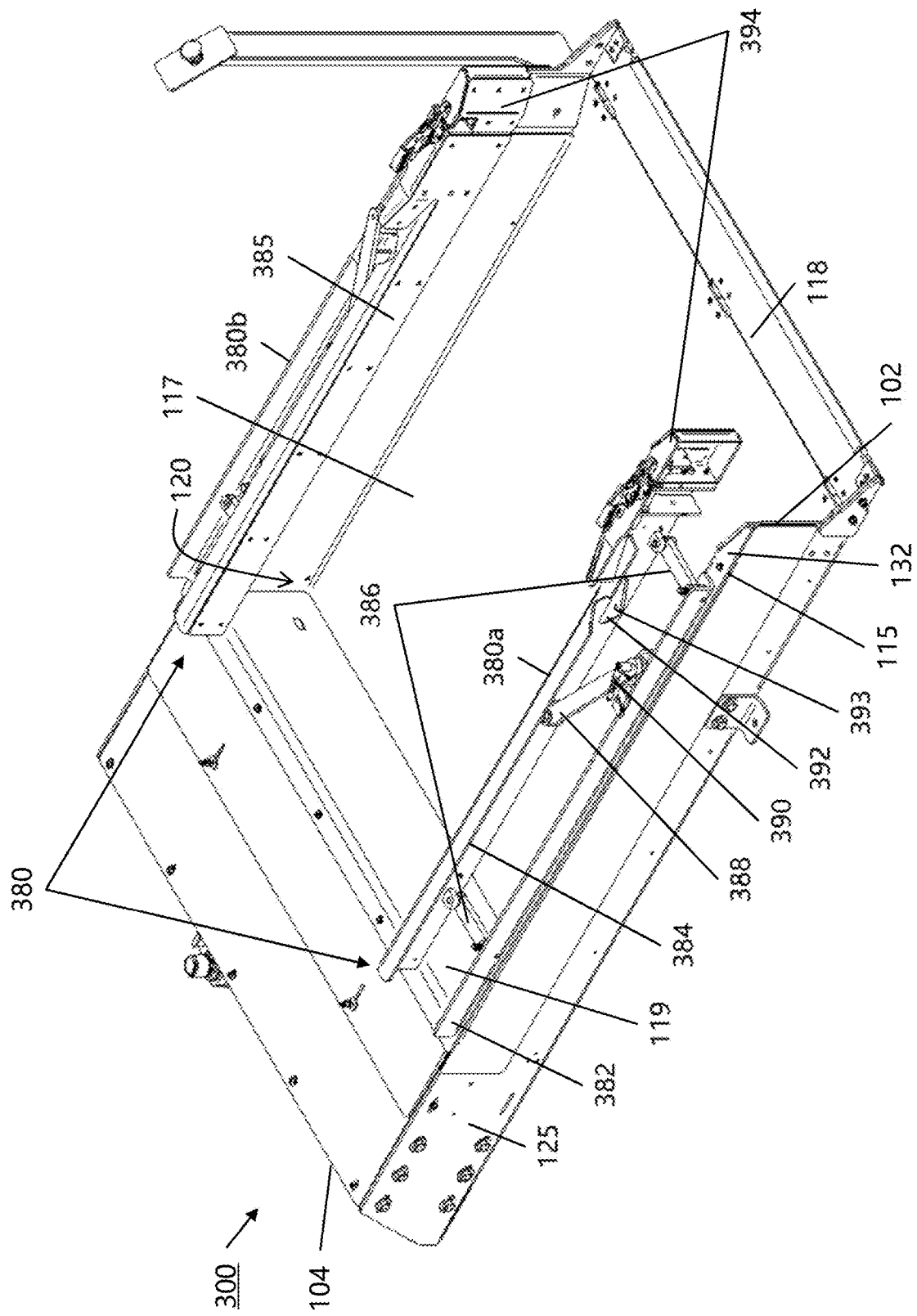
FIG. 14 is a front perspective view of a third embodiment of the vibratory unit or compaction device of the present disclosure, which has adapters configured to narrow the effective width of the device to accommodate containers of varying sizes.
Figure 15:
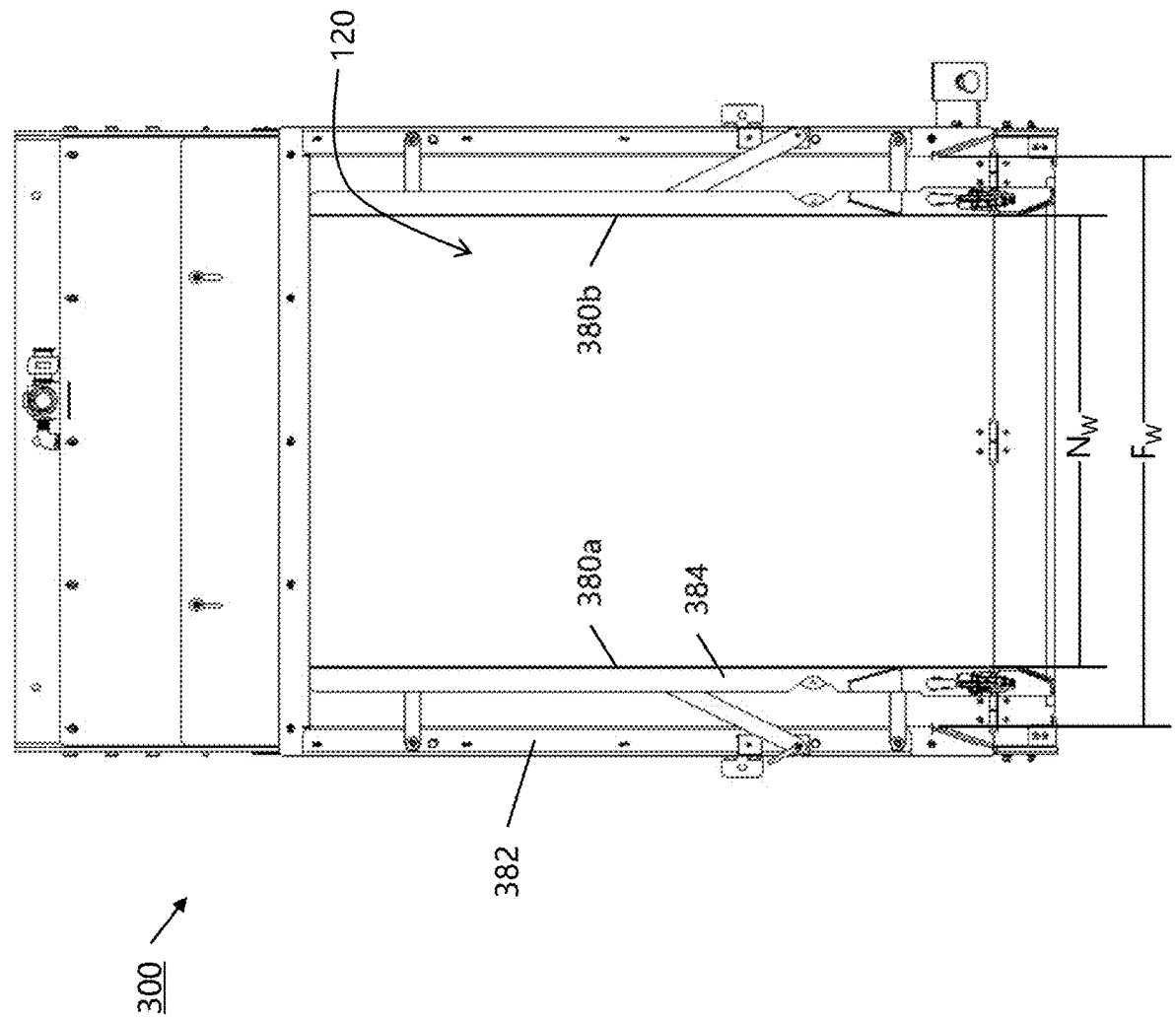
FIG. 15 is a top view of the third embodiment of FIG. 14.
Figure 16:
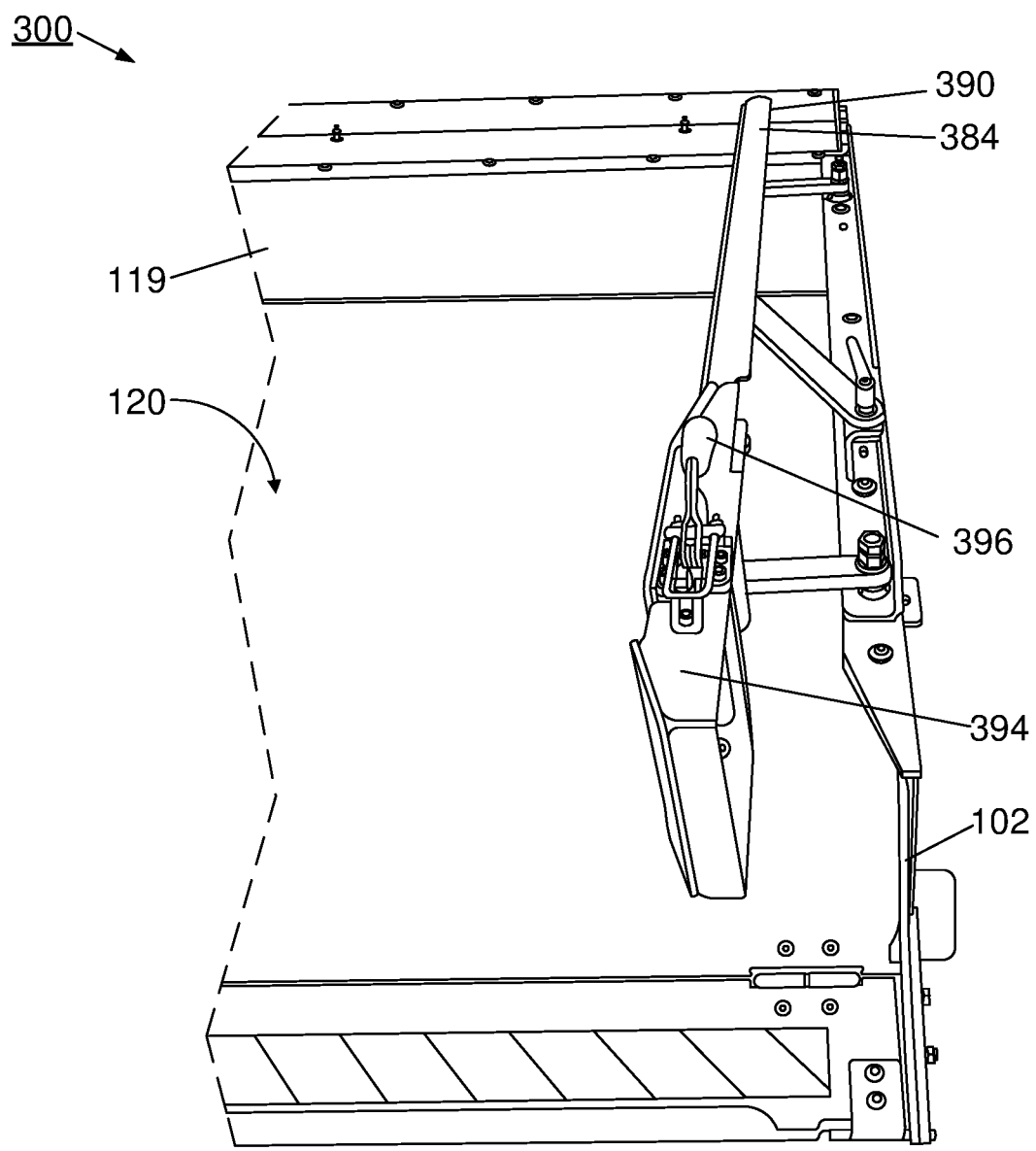
FIG. 16 is a picture of the third embodiment of FIG. 14 showing a close-up view of the adapter.
Figure 17:
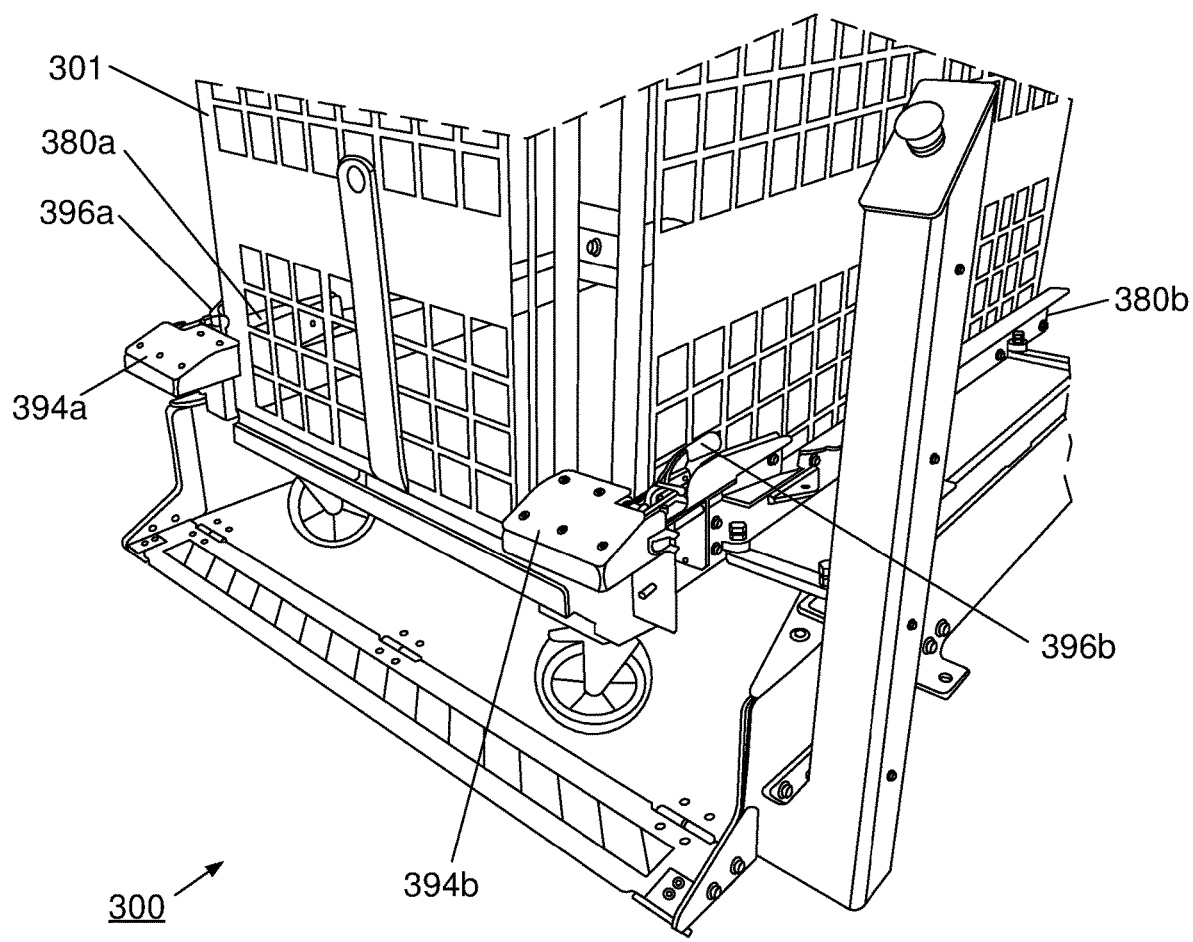
FIG. 17 is another picture of the third embodiment of FIG. 14 showing how a specialty container is placed on the compaction device.

FIGS. 14-17 illustrate a third embodiment of the vibratory unit or compaction device of the present disclosure. The third embodiment includes an adapter that can be mounted to the device and positioned such that the effective width of the storage volume/open area of the moving upper structure is narrowed to accommodate large containers of different sizes. FIG. 14 is a front perspective view. FIG. 15 is a top view. FIG. 16 is a close-up cutaway picture of the device with the adapter mounted thereon. FIG. 17 is another picture showing a specially sized container loaded onto the device with the adapter securely constraining the container within the moving upper structure. These figures include the sidewalls 126 of the stationary base 125 and the side guards 121 of the upper structure 115, thus the linkages are hidden from view. However, it should be noted that the stationary base structure 125 is still connected to the upper structure 115 using the linkage arrangements described above.

Referring first to FIG. 14, the compaction device 300 still includes an upper structure 115 and a stationary base structure 125 as previously described. The compaction device also includes a front (or load) end 102 and opposing rear (or non-loading) end 104 as previously described. The rear sidewall 119 of the upper structure is also included as a reference point. Generally, at least one adapter 380 is included with the compacting device 300 to adjust the effective width of the storage volume 120. As depicted here, the compacting device 300 includes two identically configured adapters, with adapter 380a illustrated in an open position on the left side of the device and adapter 380b illustrated in a closed (or retracted) position on the right side.

Each adapter includes an outer bracket 382 which mounts along the top of sidewall 116. The outer bracket extends between the rear sidewall 119 and the loading end 118 of the upper structure 115. Each adapter also includes an inner bracket 384 mechanically connected to the outer bracket 382, such that the inner bracket can move away from the outer bracket. A vertically oriented guide surface 385 on the inner bracket 384 is configured to engage the side of a container that is loaded onto the upper structure 115. In this regard, the guide surface 385 has a low-friction surface to help reduce resistance between the container and adapter during loading.

The mechanical connection arrangement between the outer and inner brackets 382, 384 includes at least one displacement arm 386 and at least one locking arm 388, both of which suspend the inner bracket above the floor 117 of the upper structure 115. As depicted here, the adapter 380 includes two displacement arms 386 (one near each end of the outer bracket 382) for added support and stability of the suspended inner bracket 384.

The displacement arm(s) 386 allows the inner bracket 384 to pivot (or rotate) away from the outer bracket 382 and extend into the storage volume 120 to narrow the effective width thereof as desired. The locking arm 388 is configured to prevent further movement of the inner bracket 384 once it is pivoted into a desired position. In this regard, the locking arm 388 also includes a lever (or handle) 390 for fixing the locking arm in one of two (or more) different positions.

Moving the lever 390 in a first direction causes the lever 390 to clamp the locking arm 388 against the outer bracket 382, thereby locking the inner bracket 384 in the desired position (i.e., the open position depicted by adapter 380a or the closed position depicted by adapter 380b). Moving the lever 390 in a second opposite direction releases the clamping force exerted between the locking arm 388 and outer bracket 382, such that the inner bracket 384 can be repositioned.

Furthermore, the inner bracket 384 includes a locking tab 392 disposed on the opposite side of the guide surface 386. The locking tab 392 is configured to receive the handle 390 when the adapter 380 is in the closed position. In other words, once the inner bracket 384 is fully retracted against the sidewall of the upper structure and the handle 390 is moved in the first direction to lock the inner bracket 384 in place, the engages the locking tab 392 to prevent unintended movement of the inner bracket. In this regard, a recess or aperture 393 is formed in the locking tab 392 to receive the handle 390 as described. One end of the adapter 380 also includes a retainer lock device 394. As will be described in further detail below, the retainer lock device 394 is configured to secure the container against the non-loading end 119 of the upper structure 115.

When more than one displacement arm is included, each displacement arm has the same length. The length of the locking arm 388 can be greater than the length of the displacement arm(s) 386. In this regard, the displacement pivot arm(s) 386 dictates the maximum distance which the inner bracket 384 can extend into the storage volume 120 of upper structure 115.

Referring now to FIG. 15, the top view of the compaction device 300 illustrates an example of the narrowest effective width which the storage volume 120 can have when using the at least one adapter 380 of the present disclosure. As in FIG. 14, two adapters 380a, 380b are installed on each side of the device in FIG. 15. When the adapters are in the open position, each inner bracket 384 is fully extended away from its corresponding outer bracket 382 and the storage volume 120 is defined by a narrow width (Nw). When the adapters are in the closed position, each inner bracket 384 is fully retracted against the sidewalls of the upper structure and the storage volume is defined by the full width (Fw).

In particular embodiments, the maximum narrow width (Nw) when adapters 380a, 380b are in the open position is about 32 inches. This width (Nw) would accommodate smaller-than-standard pallet sizes having a footprint of about 32 inches by 48 inches. The full width (Fw) when the adapters 380a, 380b are in the closed position is about 40 inches. The full width (Fw) is used to accommodate standard sized pallets having a footprint of about 40 inches by 48 inches.

Each adapter 380 in the closed position is configured to substantially fit within the existing profile defined by the sidewall 116 of the upper structure (which is typically around 2 inches in width). This ensures that even when a narrower effective width is not needed, the adapter can remain installed without interfering with the functionality of the device when working with containers that use up the entire area of the floor 117. By being able to keep the adapter in place, personnel can save time by not having to install or remove the adapter on an as-needed basis. Moreover, by including the locking lever 390 described above, no additional tools or specialists are required to reconfigure the adapters when necessary.

It is noted that some specialty containers are mounted on casters. For these situations, additional retention mechanisms may be provided to help ensure that the container is constrained to the compaction device during operation thereof. In FIG. 16 and FIG. 17, a retainer lock device 394 is depicted which achieves this goal.

Referring first to FIG. 16, the retainer lock 394 is mounted to the end of the adapter 380 and is located generally adjacent to the loading end 102 of the device 300. More particularly, the retainer lock 394 is mounted to the end of the inner bracket 384 via a connection which allows the retainer lock to rotate approximately 90 degrees upward toward the interior storage volume 120. Thus, the retainer lock 394 is configured to move between the open position depicted in FIG. 16 which permits loading of the container, and the closed position depicted in FIG. 17 which secures the container against the non-loading end 119 of the upper structure 115. A toggle clamp 396 is mounted on the end of the adapter, and engages the retainer lock 394 to maintain both the open position and the 90-degree closed position as desired.

With reference to the picture of FIG. 17, a perspective front view illustrates the use of a specialty container 301 with the compaction device 300. The smaller container 301 is located within the storage volume of the upper structure. Adapters 380a, 380b are locked in the closed position, i.e. with the inner bracket extended away from the outer bracket. The toggle clamps 396a, 396b maintain the retainer locks 394a, 394b in the 90-degree closed position. The retainer locks 394a, 394b apply pressure to the end of container 301 when in the 90-degree closed position, pushing the container against the non-loading end of the upper structure to hold the container securely in place during operation of the device 300.

The following examples are provided to illustrate the devices and methods of the present disclosure. The examples are merely illustrative and are not intended to limit the disclosure to the devices, conditions, or process parameters set forth therein.

EXAMPLE

Tests were performed to measure the increased capacity of a device (hereinafter, "test device") configured similarly to exemplary devices 100 and 200 discussed above. More particularly, gaylords were loaded with multiple individual packages and placed on the test device where mechanical vibrations could be applied. The total capacity of the gaylord after mechanical vibrations were introduced via the test device was then compared with the capacity achieved without the using the test device.

The test began by filling gaylords with a plurality of individual packages. Once an individual gaylord was closed out, the full gaylord as moved to an area set aside for the testing. The number of individual packages was recorded along with a vertical linear measurement of open space at the top of the gaylord. Test gaylords were not manually shaken or otherwise interacted with during the filling process.

A pallet and empty gaylord was then placed on the vibratory test device. Packages were manually removed from the previously filled gaylord and randomly tossed into the new empty gaylord. During the filling process, once the mid-point of the gaylord was reached, the gaylord was shaken 2-3 times with the test device. When all packages were placed in the test gaylord, a final period of vibration was executed by the test device.

The associate conducting the testing then measured the free or open vertical space at the top of the gaylord and recorded this measurement. The number of packages in the gaylord was divided by the unshaken height of the packages to arrive at the number of packages per linear inch.

For example, in the first gaylord tested, there were 740 individual packages and 6 inches of free space at the top of the gaylord prior to shaking. This resulted in a 59-inch-tall stack of product and 12.54 packages per vertical inch. After shaking/vibration with the test device, an increase in free vertical space of about 7 inches was measured in the gaylord. With the increased free vertical space, it was determined that an additional 87.8 packages could be placed in this gaylord (i.e., 12.54 packages per vertical inch×7 inches). An 11.9% increase in gaylord capacity was achieved as a result.

Results

A total of seven gaylords were tested for increased capacity in accordance with the process described above. As a result of the testing, an overall average increase in capacity of about 12% was achieved.

Subsequent testing was performed to determine the increase in capacity achieved by manually shaking the gaylord without the test device. In particular, the gaylord was shaken manually when filled at various intervals, including ½ full, ¾ full, and full. The manual shaking of the gaylord resulted in an increased capacity of between about 7-9%.

Thus, the testing showed that using the test device to mechanically shake or vibrate a full gaylord can achieve a beneficial increase in gaylord capacity. This is compared to gaylord capacity when no shaking/vibration or only manual shaking/vibration is performed on the gaylord. Such an increase in capacity further adds value by increasing shipping efficiency and reducing risk of workplace injury due to manual shaking/vibration.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

To aid the Patent Office and any readers of this application and any resulting patent in interpreting the claims appended hereto, there is no intent for any of the appended claims or claim elements to invoke 35 U.S.C. § 112(f) unless the words "means for" or "step for" are explicitly used in the particular claim.

The invention claimed is:

1. A compaction device, comprising:
   an upper structure configured to hold a container;
   a base structure connected to the upper structure through a first front end pivot linkage and a first rear end pivot linkage; and
   a first actuator configured to convey motion to the upper structure;
   wherein the first front end pivot linkage has a different length from the first rear end pivot linkage.

2. The compaction device of claim 1, wherein the first front end pivot linkage is longer than the first rear end pivot linkage.

3. The compaction device of claim 1, wherein the first rear end pivot linkage is longer than the first front end pivot linkage.

4. The compaction device of claim 1, wherein in a resting position:
   the first front end pivot linkage has a longitudinal axis perpendicular to a lower edge of the base structure; and
   the first rear end pivot linkage has a longitudinal axis that forms an acute angle with the lower edge of the base structure.

5. The compaction device of claim 1, wherein in a resting position:
   the first rear end pivot linkage has a longitudinal axis perpendicular to a lower edge of the base structure; and
   the first front end pivot linkage has a longitudinal axis that forms an acute angle with the lower edge of the base structure.

6. The compaction device of claim 1, wherein the first actuator is in the form of a pneumatic cylinder.

7. The compaction device of claim 1, wherein the upper structure comprises a floor and three vertical sidewalls extending perpendicularly from the floor on a first side, a second side, and a rear end of the upper structure.

8. The compaction device of claim 7, wherein the upper structure does not have a sidewall along a front end.

9. The compaction device of claim 7, wherein the first front end pivot linkage and the first rear end pivot linkage are connected to the vertical sidewall on the first side of the upper structure, and the first actuator conveys motion proximate the first side of the upper structure.

10. The compaction device of claim 9, further comprising:
a second front end pivot linkage and a second rear end pivot linkage connected to the vertical sidewall on the second side of the upper structure and connected to the base structure; and
a second actuator that conveys motion proximate the second side of the upper structure;
wherein the first front end pivot linkage and the second front end pivot have the same length; and
wherein the first rear end pivot linkage and the second rear end pivot have the same length.

11. The compaction device of claim 7, further comprising an adapter mounted upon the vertical sidewall on the first side of the upper structure, the adapter configured to reduce an effective width of the upper structure.

12. The compaction device of claim 1, wherein the base structure comprises a rear housing for the first actuator; a first sidewall; and a second sidewall; wherein the upper structure is located between the first sidewall and the second sidewall of the base structure.

13. The compaction device of claim 12, further comprising a first side guard and a second side guard attached to the upper structure, such that the first sidewall and the second sidewall of the stationary base structure are located between the upper structure and the side guards.

14. The compaction device of claim 1, further comprising a control system for controlling the first actuator.

15. The compaction device of claim 14, wherein the control system is located proximate a rear end of the base structure, and the device further comprises a pushbutton for activating the control system which is located proximate a front end of the base structure.

16. The compaction device of claim 1, wherein the base structure has a larger footprint than the upper structure.

17. A method for operating a compaction device, comprising:
placing a container with an asymmetric load in an upper structure of the compaction device; and
using at least a first actuator to cause the upper structure to move;
wherein the compaction device comprises:
the upper structure configured to hold the container;
a base structure connected to the upper structure through a first front end pivot linkage and a first rear end pivot linkage; and
the first actuator configured to convey motion to the upper structure;
wherein the first front end pivot linkage has a different length from the first rear end pivot linkage.

18. A compaction device, comprising:
an upper structure configured to hold a container, a first side of the upper structure being connected to a first front end upper toggle pivot linkage and a first rear end upper toggle pivot linkage;
a base structure, a first side of the base structure being connected to a first front end base toggle pivot linkage and a first rear end base toggle pivot linkage;
a first pull arm connected to the first front end upper toggle pivot linkage, the first front end base toggle pivot linkage, the first rear end upper toggle pivot linkage, and the first rear end base toggle pivot linkage; and
a first actuator connected to the first pull arm for conveying motion to the upper structure.

19. The compaction device of claim 18, further comprising a primary cam follower connected to a first side of the upper structure, wherein the primary cam follower is configured to guide the upper structure by moving along a flat surface of a primary cam located on a first side of the base structure.

20. The compaction device of claim 18, wherein the first front end upper toggle pivot linkage, the first front end base toggle pivot linkage, the first rear end upper toggle pivot linkage, and the first rear end base toggle pivot linkage are of equal length.

* * * * *